(12) United States Patent
Glover

(10) Patent No.: US 11,130,513 B2
(45) Date of Patent: Sep. 28, 2021

(54) CART ADAPTED FOR CONNECTION TO A WHEELCHAIR

(71) Applicant: Darius Glover, Riverdale, GA (US)

(72) Inventor: Darius Glover, Riverdale, GA (US)

(*) Notice: Subject to any disclaimer, the term of this patent is extended or adjusted under 35 U.S.C. 154(b) by 0 days.

(21) Appl. No.: 16/781,821

(22) Filed: Feb. 4, 2020

(65) Prior Publication Data
US 2020/0269897 A1     Aug. 27, 2020

Related U.S. Application Data

(63) Continuation-in-part of application No. 15/870,434, filed on Jan. 12, 2018, now Pat. No. 10,751,234.

(60) Provisional application No. 62/445,581, filed on Jan. 12, 2017.

(51) Int. Cl.
| | |
|---|---|
| *B62B 5/02* | (2006.01) |
| *B62B 5/00* | (2006.01) |
| *A61G 5/10* | (2006.01) |
| *B62B 3/04* | (2006.01) |

(52) U.S. Cl.
CPC ............ *B62B 5/002* (2013.01); *A61G 5/1094* (2016.11); *A61G 2203/80* (2013.01); *B62B 3/04* (2013.01); *B62B 2207/02* (2013.01)

(58) Field of Classification Search
CPC ....... B62B 5/002; B62B 2207/02; B62B 3/04; A61G 5/1094; A61G 2203/80
See application file for complete search history.

(56) References Cited

U.S. PATENT DOCUMENTS

| | | | | |
|---|---|---|---|---|
| 4,305,601 A | * | 12/1981 | Berge ................ | A61G 5/10 280/304.1 |
| 4,611,819 A | * | 9/1986 | Glasford ............ | A61G 5/10 280/304.1 |
| 4,778,037 A | * | 10/1988 | Papadopoulos ..... | F16F 3/04 188/378 |
| 5,957,477 A | * | 9/1999 | Ensz ................. | B60D 1/167 280/482 |
| 6,702,313 B2 | * | 3/2004 | Forshee ............. | A61G 5/10 280/304.1 |
| 8,308,406 B2 | * | 11/2012 | Parks ................ | A61G 5/10 410/7 |
| 8,870,209 B2 | * | 10/2014 | Conrad ............. | B60D 1/167 280/304.1 |
| 9,308,790 B1 | * | 4/2016 | Sharp ............... | B60D 1/167 |
| D770,716 S | * | 11/2016 | Giampavolo ............. | D34/17 |

\* cited by examiner

*Primary Examiner* — Tony H Winner
*Assistant Examiner* — Marlon A Arce
(74) *Attorney, Agent, or Firm* — Dentons US LLP

(57) ABSTRACT

A cart for connecting or attaching to a wheelchair is provided to assist a wheelchair user to more easily collect and move items, such as groceries. In certain embodiments the cart is further defined as a shopping cart.

13 Claims, 19 Drawing Sheets

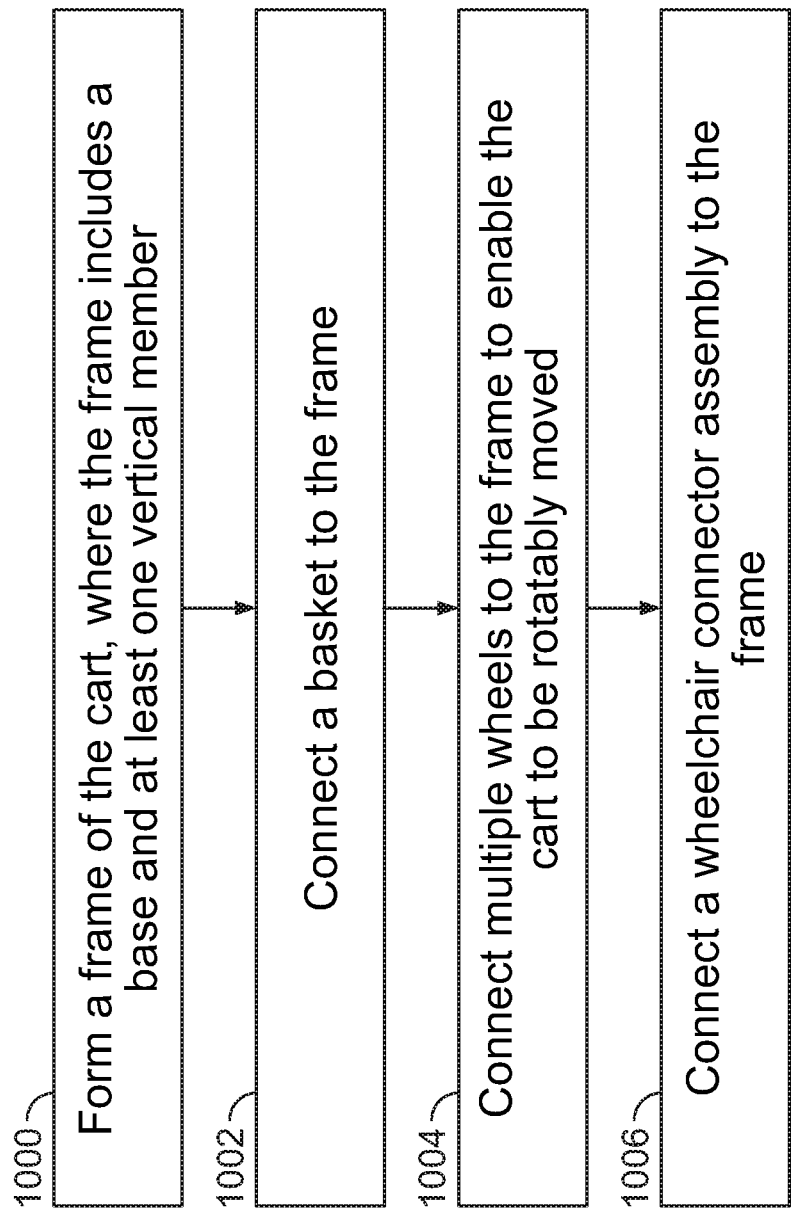

CART ADAPTED FOR CONNECTION TO A WHEELCHAIR

CROSS-REFERENCE TO RELATED APPLICATIONS

This Application is a continuation-in-part of U.S. application Ser. No. 15/870,434, filed Jan. 12, 2018, entitled "CART ADAPTED FOR CONNECTION TO A WHEELCHAIR," which claims the priority to U.S. Provisional Application Ser. No. 62/445,581, filed Jan. 12, 2017, the contents of each of which are hereby incorporated by reference in their entirety.

FIELD OF THE INVENTION

The principles of the present invention relate generally to a cart adapted to connect to, or in some embodiments engage with, a wheelchair to facilitate shopping by a user in the wheelchair.

BACKGROUND OF THE INVENTION

Currently, handicapped shoppers are provided with few options when it comes to shopping in most stores: ask an employee to help them out of their personal wheelchair into a generic store owned wheelchair that has a small basket welded on; place a small unstable plastic hand basket on their lap; or have assistance from an employee pushing around a cart, accompanying the individual while they shop. Whenever the handicapped shopper needs an item that is out of their reach, the shopper either need to apply excessive strain and creativity to get the item or ask someone for help. Grocery stores have hundreds of handicapped customers who lack the freedom of shopping independently. Therefore, the need for a product that will ease such tasks for handicapped shoppers.

BRIEF SUMMARY OF THE INVENTION

One embodiment of a cart that allows individuals in wheelchairs to shop comfortably and independently, the cart being securely attached to the user's wheelchair. The cart of the present disclosure is adaptable to most wheelchairs that are currently on the market today. The cart of the present disclosure is configured to maneuver through a store and around other people in a fluid manner as a result of a secured connection mechanism and, optionally, a wheel base of the cart. The cart of the present disclosure may also be configured so as to fit over the user's lap, which reduces the need for the user to reach far to place items in the cart.

Another embodiment of a cart that is releasably attachable with a wheelchair may include a frame and a basket connected to the frame. Multiple wheels may be configured to support the frame. A pair of wheelchair connector arms may be connected to the frame, and include a bracket connected to the frame, a guidepost extending from the bracket, a compression spring coaxially disposed on the guidepost, and an arm having a first end and a second end. The first end of the arm may be slidably supported by the guidepost. The compression spring may be configured to apply a force to the bracket and the arm. The arm may be releasably attachable with the wheelchair.

Another embodiment may include a cart adapted for connection with a wheelchair, the cart including a frame including a lower frame portion and an upper frame portion. At least one leg may be connected between vertical elements attached to the base. A basket may be connected to the upper frame portion. Multiple wheels may be attached to the lower frame portion base. A pair of wheelchair connector arms may be connected to the frame. The connector arms may include a bracket connected to the frame, and a guidepost extending from the bracket, a compression spring coaxially disposed on the guidepost. An arm may have a first end and a second end, the first end of the arm may be slidably supported by the guidepost. The compression spring may be configured to apply a force to the bracket and the arm. A retention member may be attached to the second end of the arm, and be oriented to face the other arm positioned on the cart.

Another embodiment may include a cart that is releasably attachable to a wheelchair, the cart including a frame including a base and a plurality of vertical members, a basket connected to the frame, a plurality of wheels connected to the base and configured to support the frame and the basket, and a wheelchair connector assembly connected to the frame. The wheelchair connector assembly may include a guidepost connected to at least two of the vertical members of the frame, and at least one retention bracket slideably attached to the guidepost, the at least one retention bracket configured to releasably attach to at least a portion of the wheelchair.

Another embodiment may include a method of releasably attaching a cart to a wheelchair. The method may include receiving at least a portion of the wheelchair in at least one retention bracket of a wheelchair connector assembly of the cart The at least one retention bracket may be configured to releasably attach to the at least a portion of the wheelchair, and the at least one retention bracket may be slideably attached to a guidepost of the wheelchair assembly. The method may further include applying a compression force upon the at least a portion of the wheelchair to form a connection between the at least a portion of the wheelchair and the at least one retention bracket. The compression force may be sufficient to maintain the connection between the at least one retention bracket and the at least a portion of the wheelchair.

Yet another embodiment may include a method of manufacturing a cart that is releasably attachable to a wheelchair. The method may include forming a frame of the cart, the frame including a base and a plurality of vertical members. The method may also include connecting a basket to the frame, configuring a plurality of wheels to support the frame and to connect to the base, and providing a wheelchair connector assembly to connect to the frame. The wheelchair connector assembly may include a guidepost connected to at least two of the vertical members of the frame, and at least one retention bracket slidably attached to the guidepost, the at least one retention bracket configured to releasably attach to at least a portion of the wheelchair.

BRIEF DESCRIPTION OF THE DRAWINGS

The following drawings form part of the present specification and are included to further demonstrate certain aspects of the present invention. The invention may be better understood by reference to one or more of these drawings in combination with the detailed description of specific embodiments presented herein.

FIG. 10 shows another flow diagram illustrating example blocks executed to implement aspects of the present disclosure.

DETAILED DESCRIPTION OF THE INVENTION

The presently described cart allows handicapped customers to maneuver the cart and move through the store with ease. The current cart options provided in stores are very inconvenient for the handicapped customer. The presently described cart allows multiple types of wheelchairs to securely attach to the cart while keeping the mechanisms simple and safe for the user.

Figure 1A:
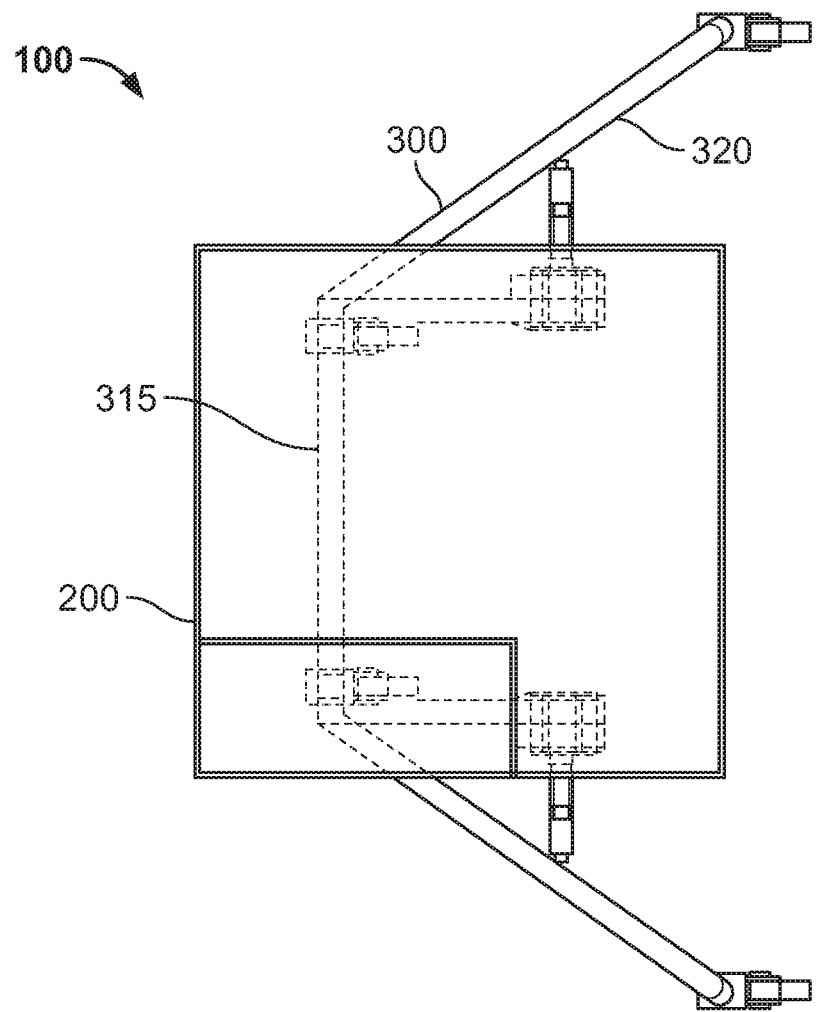
FIGS. 1A-1D are illustrations of different views of an illustrative embodiment of a cart configured to be releasably attached to a wheelchair.

With regard to FIG. 1A, an illustration of a top view of an illustrative cart is shown. The cart 100 may include a basket 200 along with a frame 300, including an upper frame 315 and a lower frame 320. Multiple legs 330 may extend from the basket 200 to the lower frame 320. The lower frame 320 may include at least one member that supports the legs and basket. More specifically, the lower frame may include (i) a front lower frame member 322 and (ii) a pair of side lower frame members 324 that angularly extend from the front lower frame member. The angle of the side free members 324 may be between about 30° and 45° relative to the forward lower frame member 322. As further shown, attached to the lower frame 320 are two pairs of wheels, including (i) a pair of forward wheels 400 and (ii) a pair of rear wheels 420. The forward wheels 400 may be disposed beneath the basket 200, and the pair of rear wheels 420 may be disposed at respective ends of the side lower frame members 324. In addition, an upper frame 315 may connect to the legs 330 and support the basket 200.

Although the lower frame 320 is shown to include three members that are connected (e.g., welded) to one another, it should be understood that alternative numbers of members (e.g., 1 or more members) may be utilized. Moreover, although four caster wheels 400, 420 are shown, alternative number and types may be utilized. For example, rather than using cylindrical wheels, spherical ball casters may be utilized, thereby providing for more easily rotatable wheels in an axial direction so as to provide for less resistance and better retention of the cart 100 to the wheelchair (i.e., less force is applied as a moment arm at a plane of the wheels of the cart). The wheels may be configured to swivel to allow the cart to rotate 360-degrees.

Supported by the upper frame portion 315 may be a pair of wheelchair connector arms 500 that, while not in operation, may hang from the upper frame portion 315. The wheelchair connector arms 500 may be rotatable to enable a user to rotate the connector arms 500 for removably attaching to a portion of the wheelchair (e.g., armrest bars or other structural member(s) of the wheelchair).

Figure 1B:
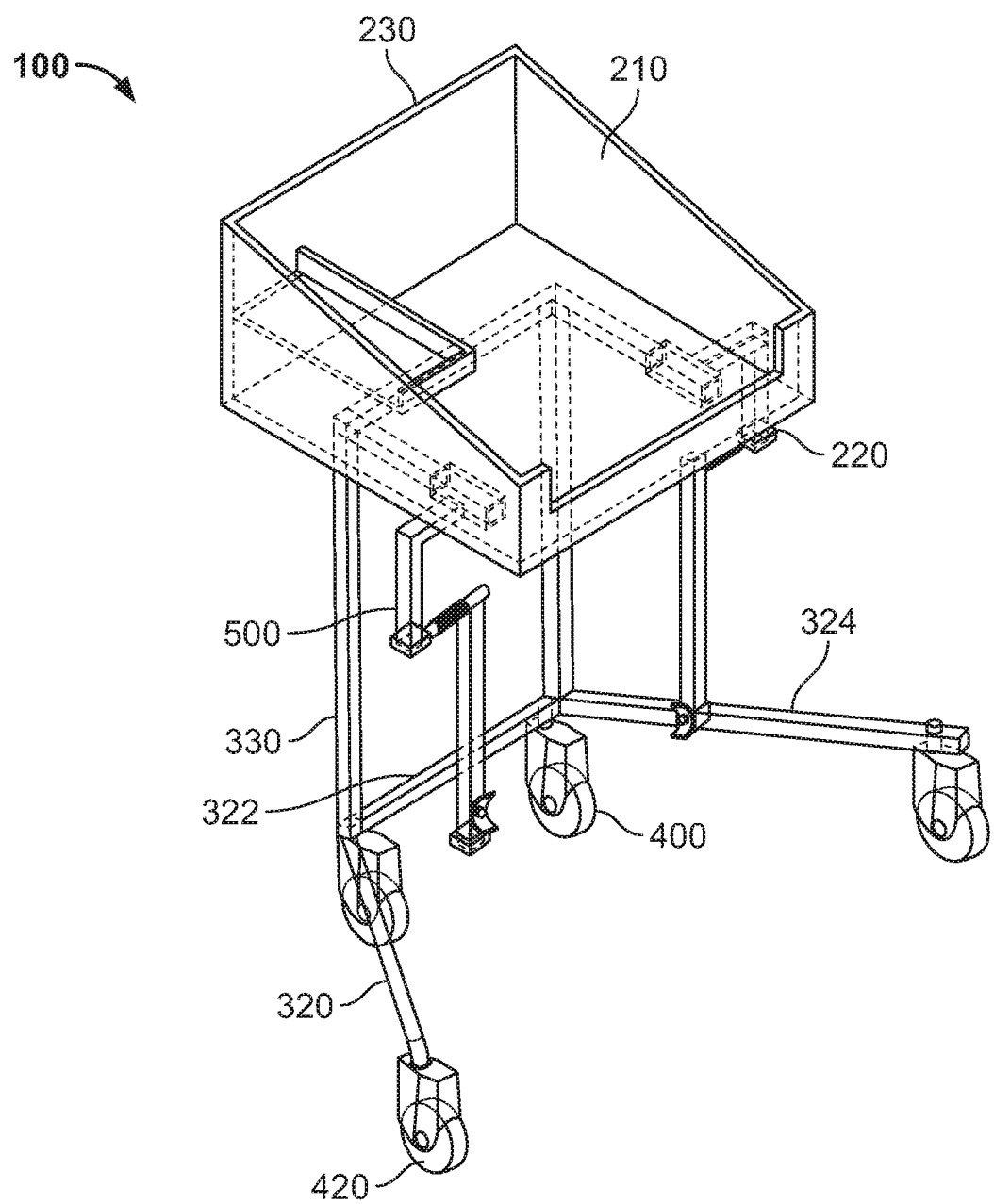

FIG. 1B is an illustration of a top front left perspective view of the cart 100 of FIG. 1A. The basket 200 has a basket front wall 220 that is low and faces a user of the basket, thereby making it easy for the user who is in a wheelchair to place products into and remove products from the basket 200. The basket sidewalls 210 are shown to have a ramped height to a back wall 230 that has a height that is tall enough to prevent taller items to be prevented from falling out. It should be understood that the sidewalls 210 may be at a constant height, but by using a sloped height, a user is more easily able to place items into the basket over the sidewalls 210 as opposed to having to place the items in the basket from the front each time. According to an embodiment of the invention, the height of the front most portion of the sidewalls 210 is approximately one-half the back most portion of the sidewalls 210. For example, the sidewalls 210 may be sloped from a front most height of 6 inches to a back most height of 12.25 inches.

Figure 1C:
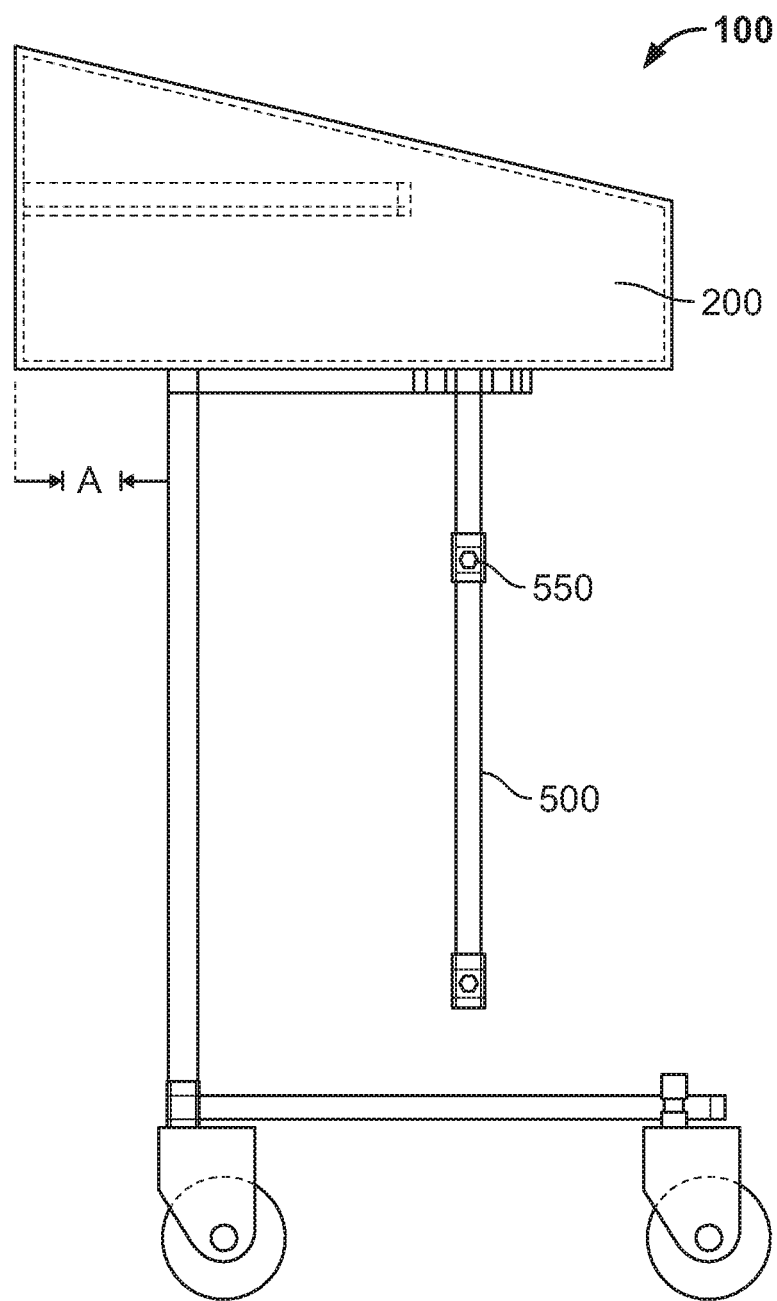

FIG. 1C shows a side view of the cart of FIG. 1A. As shown, the wheelchair connector arms 500 may extend downward and include a hinge member 550 about a quarter of the way down along the wheelchair connector arms. In an embodiment, height of the connector arms 500 may be adjusted so that the connector arms 500 are able to properly engage a wheelchair of different types and heights. In an embodiment, for optimal stability and reduced overall footprint of the wheelchair-cart combination, the basket 200 may be disposed so that the distance A between the back wall and the vertically extending legs 330 is approximately 20 to approximately 25 percent of the overall length of the basket 200. For example, according to an embodiment of the invention, the basket is sized 24×24 inches and the distance A shown in FIG. 1C is 5.5 inches.

Figure 1D:
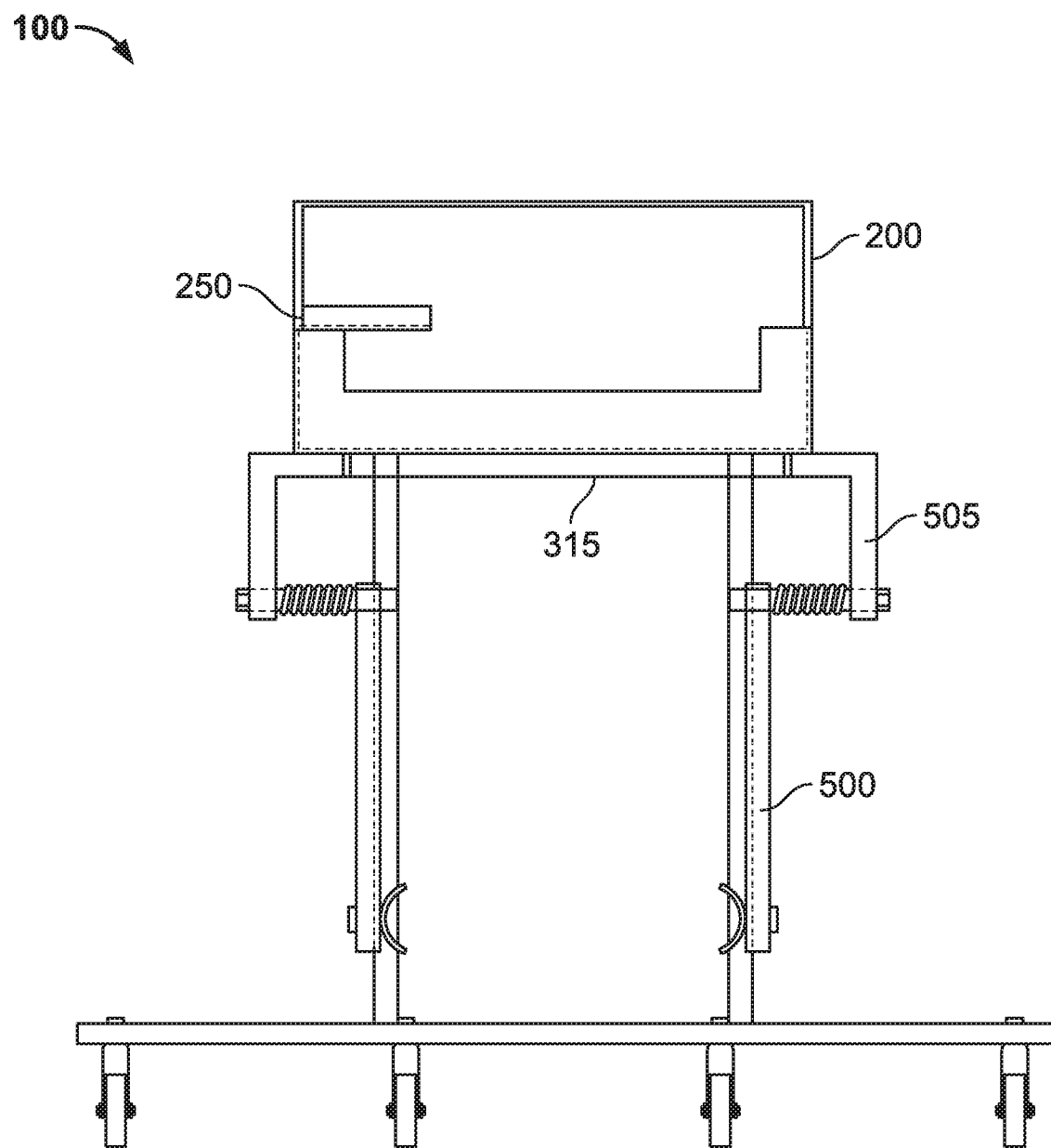

FIG. 1D shows a front view of the cart of FIG. 1A. As shown, the wheels 400, 420 have approximately equal spacing. It should be understood that the spacing may not be substantially equal. The wheelchair connector arms 500 are also shown to have a bracket member 505 that connects to the upper frame members 315 and that extend laterally beneath and outward from the basket 200. The spacing, at least in part, enables the cart to properly align the connector arms 500 to engage structures of the wheel chair, such as arm or leg members of a wheelchair. The brackets 505 may be fixed length or be adjustable as to enable different width wheelchairs to be more easily used. In an embodiment, the brackets 505 may be rotatably configured to enable the brackets 505 to be moved underneath the basket 200 for storage purposes.

The cart 100 is configured so that when the wheelchair and cart 100 are connected together, the combination wheelchair-cart has a minimal turning radius. In certain embodiments, the turning radius is between about three to about four feet with the ability to rotate in place, making it easy for the user to maneuver the cart 100 around a store. The cart is configured so as to have minimal weight. For example, the maximum cart weight is under about 50 pounds. Additionally, the maximum volume of the cart 100 is between about 5,000 to about 6,000 cubic inches, and the carrying capacity is over about 200 pounds. These dimensions and values allow the basket 200 to be large enough for the user to have enough space to hold a sufficient amount of items without the cart 100 being too large given that the cart 100, when in use, is rigidly attached to a wheelchair of the user. In some embodiments, the basket 200 includes at least one shelf 250 to hold items. The shelf 250 may be large enough to hold a carton of eggs and/or other small and/or delicate items. The shelf 250 may include a shelf bottom surface 252, a shelf front wall 254, and a shelf sidewall 256 (shown in FIG. 6B). Other support members may be provided within or outside of the basket 200 (e.g., beneath the basket). In operation, the cart 100 is configured through use of the wheelchair connector arms 500 to maintain a secure connection during the entirety of the shopping trip, thereby maintaining safety of the user and providing ease of use.

Figure 2A:
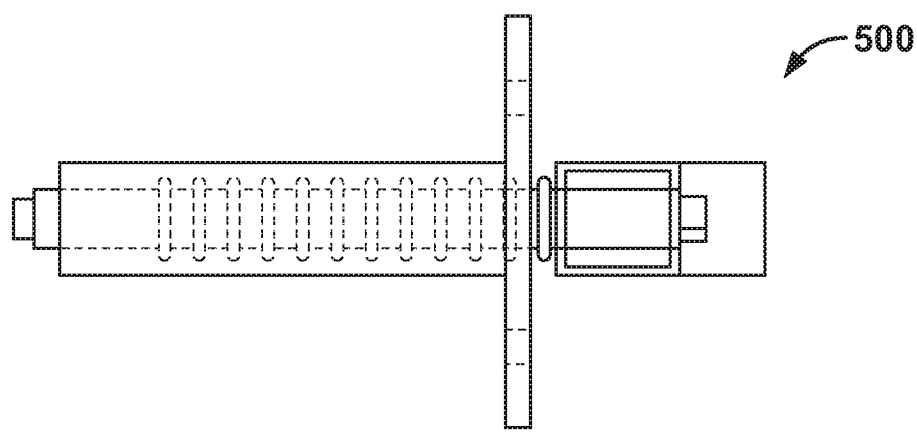
FIGS. 2A-2D are illustrations of different views of an embodiment of a connector element for use in releasably attaching the cart of FIGS. 1A-1D and wheelchair.
Figure 2B:
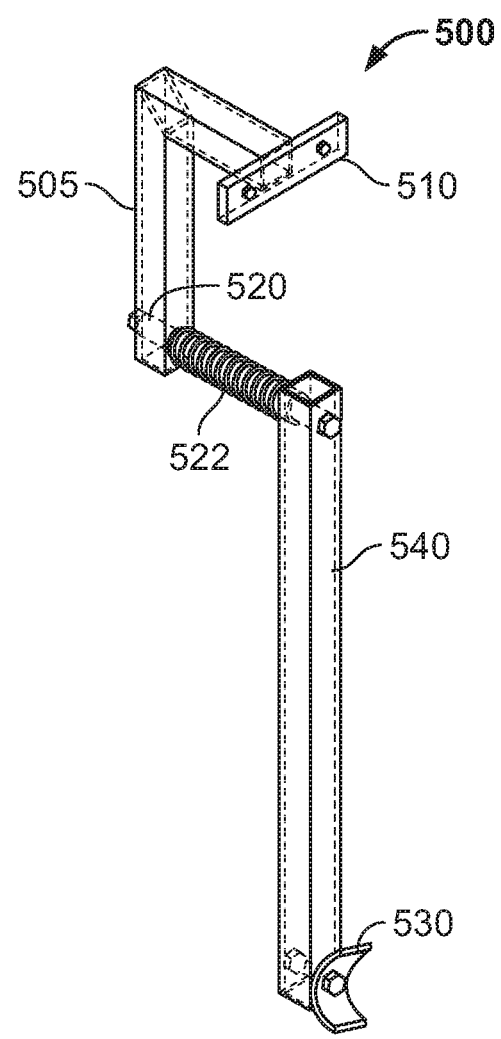

FIGS. 2A-2D are illustrative drawings of a wheelchair connector arm 500 according to an embodiment of the invention. FIG. 2A is a top view illustration of the wheelchair connector arm 500, which shows that the arm is substantially planar when not in use (i.e., hanging from the upper frame). FIG. 2B is a top front left perspective view of the wheelchair connector arm 500, which shows that there is a bracket member 505 having a 90-degree bend at an elbow and a connector bar 510 that is configured to attach to the upper frame 315 (see FIG. 2D). It should be understood that alternative bracket and members or methods for attachment may be utilized.

As shown, at the bottom of a vertical bracket member 505, a connector rod 520 may connect to the bracket member 505 and an arm 540 on which a retention member 530 or other attachment member may be positioned. The retention member 530 may have a semicircular shape to at least partially encircle a tube member of a wheelchair. The connector rod 520 in this embodiment includes one or more springs 522 that enables the arm 540 to slide outward and inward along the connector rod 520, as further described with regard to FIG. 5, but is not limited thereto. The spring(s) 522 may provide enough outward force or deflection load (i.e., the amount of force generated by a spring at a specific distance traveled) to allow the user to align the retention member on a portion of the wheelchair (e.g., vertical bar of the wheelchair) and to cause the retention member 530 to be engaged in a forceful enough manner to maintain a rigid connection (i.e., not easily bent) or semi-rigid or sturdy connection (e.g., bent with some minimum level of force that is reasonable for someone to apply), but that enables a user to disengage the wheelchair arms 500) from the wheelchair when complete. In an embodiment, the force of the spring(s) 522 may provide for pressure between 20 and 50 PSI. In an embodiment, the deflection load may be between about 5 pounds and about 50 pounds. Other higher or lower forces may alternatively be utilized. The arm 540 is able to rotate around the connector rod 520, thereby providing for adjustable heights of the retention member 530 to engage the wheelchair. Although a spring may be utilized, it should be understood that alternative configurations that do not use a spring may be utilized, as well, to provide for the same or similar functionality. For example, slide mechanisms that allow slidable engagement of the connector rod 520 with the wheelchair arms 500 may be utilized.

Figure 2C:
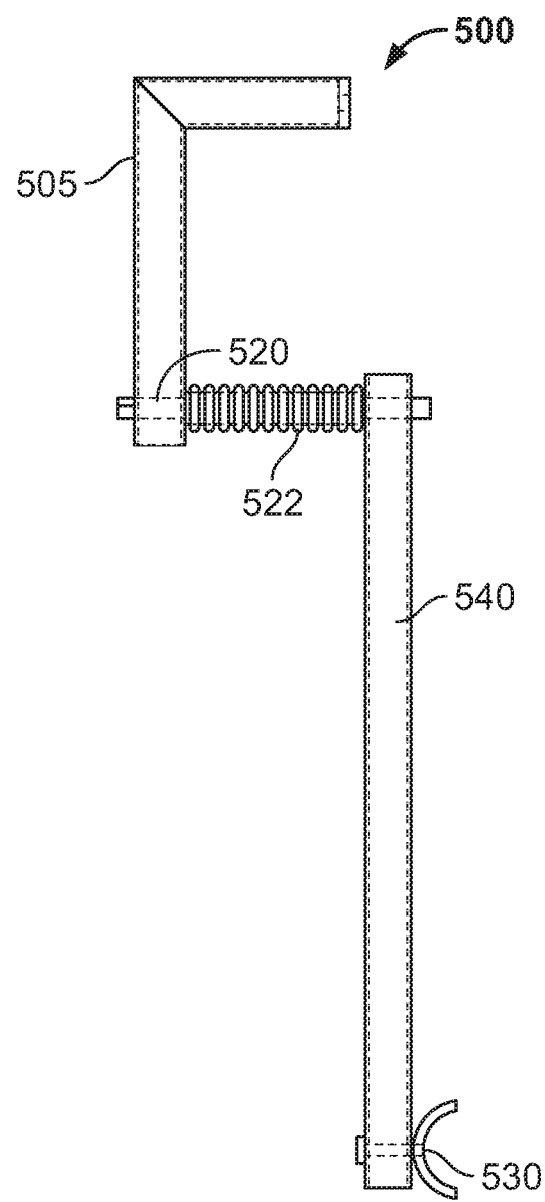
Figure 2D:
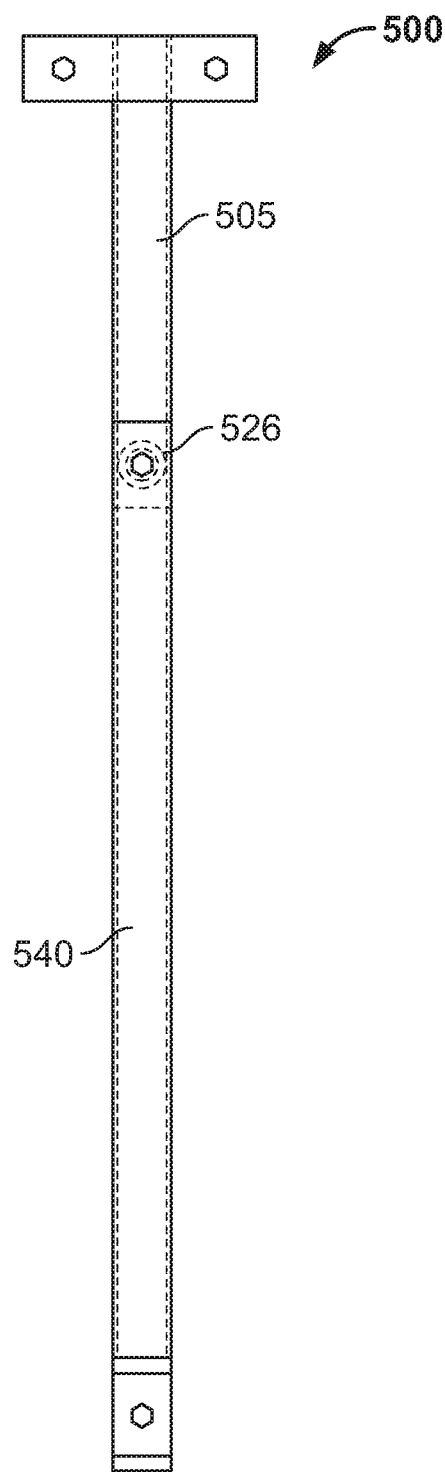

FIG. 2C is a side view of the wheelchair connector arm 500 that shows how the bracket member 550, connector rod 520, and arm 540 are aligned, and how the arm 540 is able to rotate, which allows for a user to easily raise the retention member 530 to a position to attach to an arm bar or other member of a wheelchair. FIG. 2D is a front view of the wheelchair connector arm 500, which shows bolt or screw holes 526 defined by the connector bar.

Figure 3A:
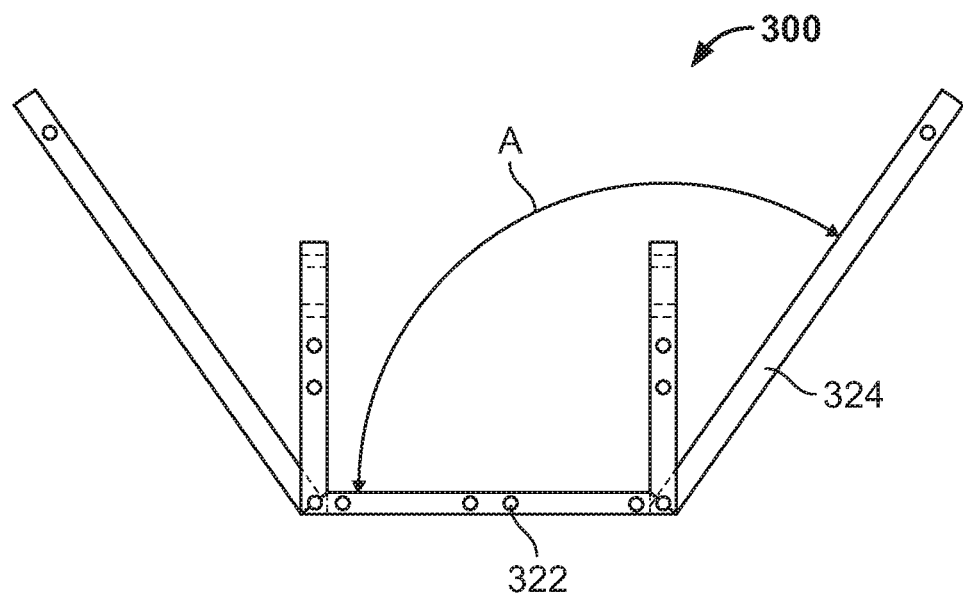
FIGS. 3A-3D are illustrations of different views of an embodiment of a frame of the cart.

FIG. 3A shows a top view of an illustrative frame of the cart of FIG. 1A. The side frame member 324 forms an angle A with respect to front frame member 322. In this embodiment of the invention, the angle A at which a side frame member 324 extends is 125 degrees from a front frame member 322. It should be understood that alternative angles may be utilized. In an alternative embodiment, the angle between the front frame member 322 and side frame members 324 may be adjustable by the user. In the embodiment shown, the side frame members 324 may be 24 inches, and a width between end points of the side frame members 324 may be about 44 inches. It should be understood that the invention is not limited to these dimensions; however, the dimensions should be established so that the side frame members 324 avoid interference of a user's wheelchair and arms for operating the wheelchair. In addition, the dimensions should be configured to provide for proper turning radius given that the cart 100 will extend from a front of a wheelchair and, thus, operate to lengthen a wheelbase of a combined wheelchair and cart 100.

Figure 3B:
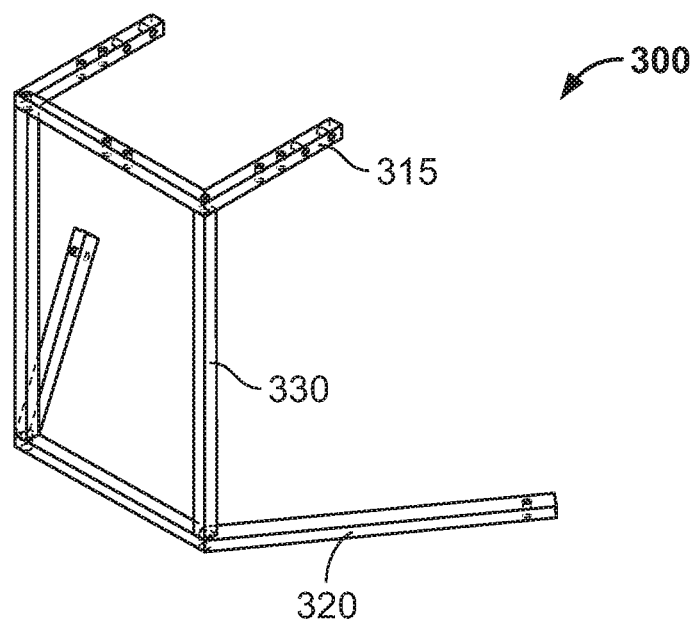
Figure 3C:
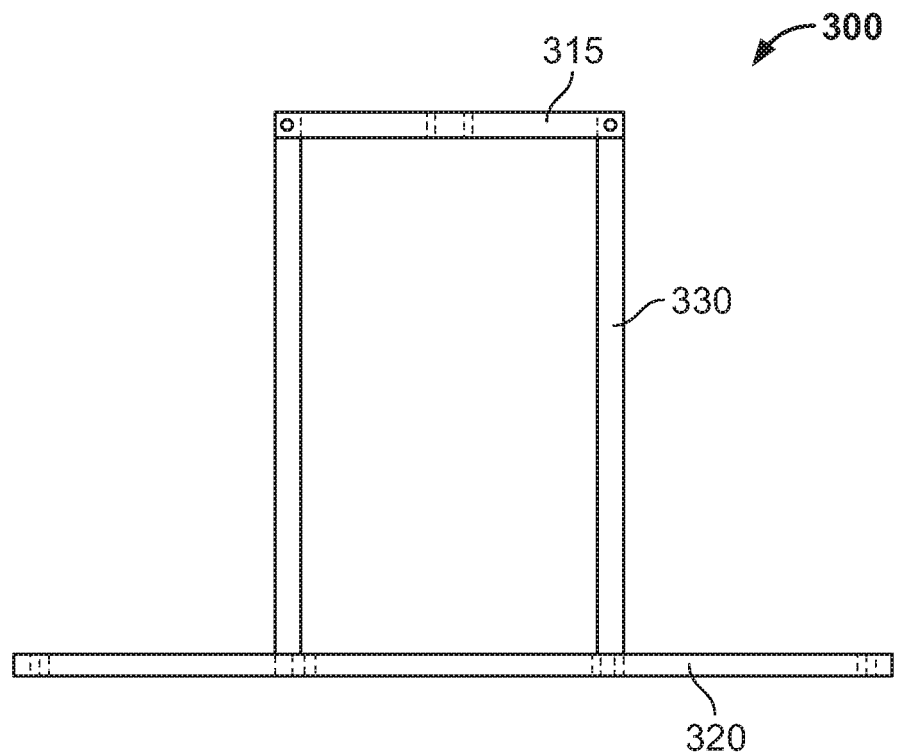
Figure 3D:
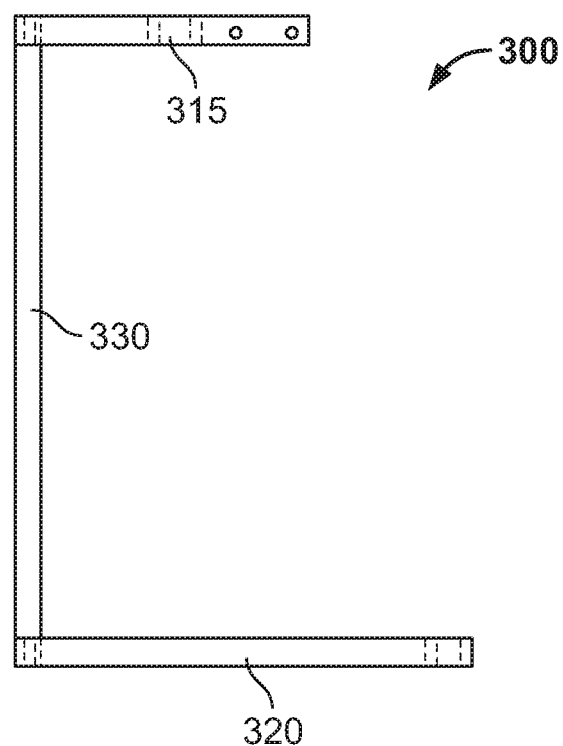

FIG. 3B shows a top front right perspective view of the frame of FIG. 3A. The connections of each of the members may be formed by welding, connector members (e.g., nuts and bolts), adhesives, or combination thereof. FIG. 3C shows a front view of the frame of FIG. 3A. FIG. 3D shows a side view of the frame of FIG. 3A.

Figure 4:
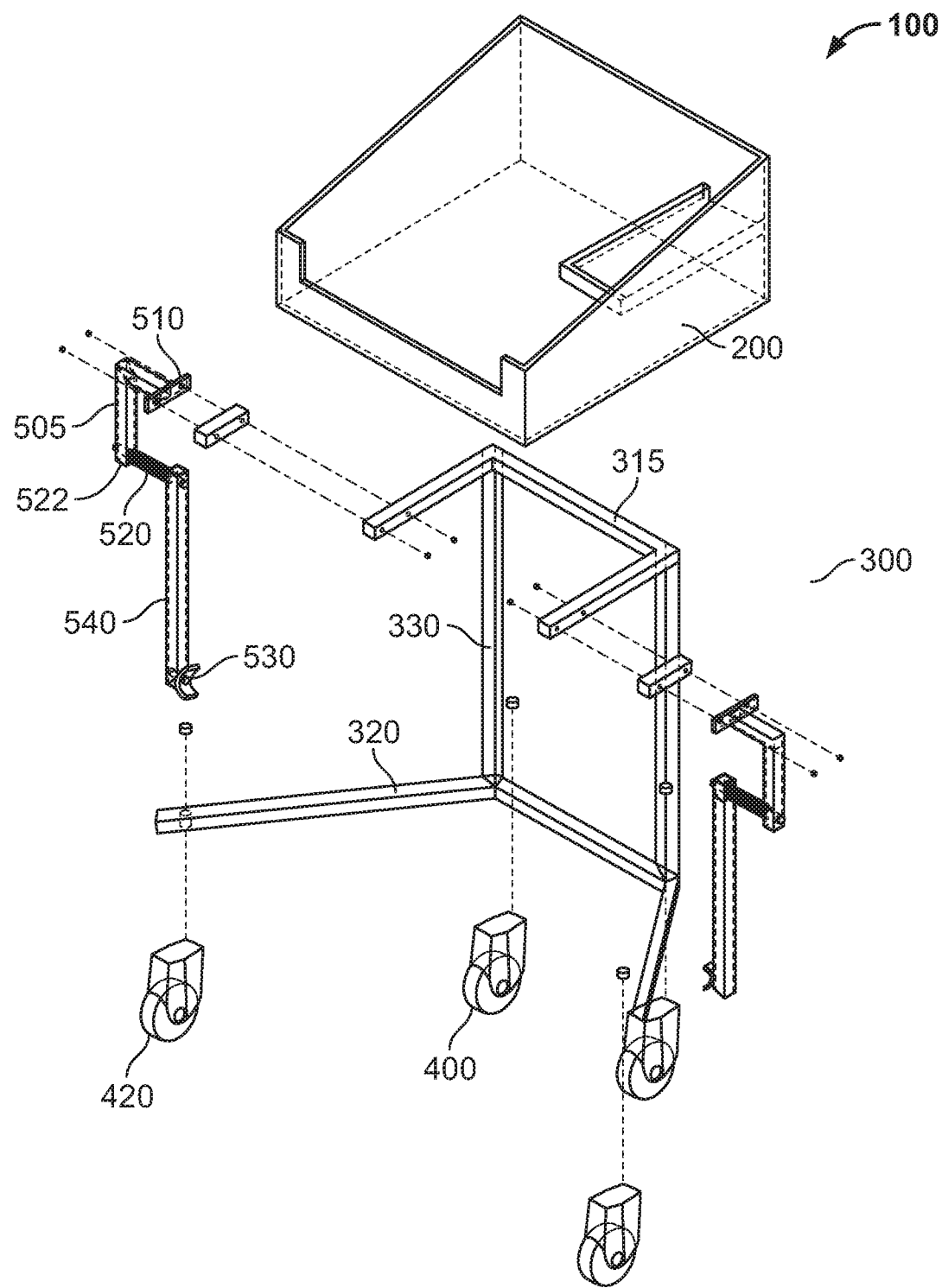
FIG. 4 is an exploded right rear perspective view of the embodiment of the cart shown in FIGS. 1A-1D showing connection of the various elements of the cart.

FIG. 4 is an exploded right rear perspective view of the embodiment of the cart 100 shown in FIG. 1 showing connection of the various elements of this embodiment of the cart.

Figure 5:
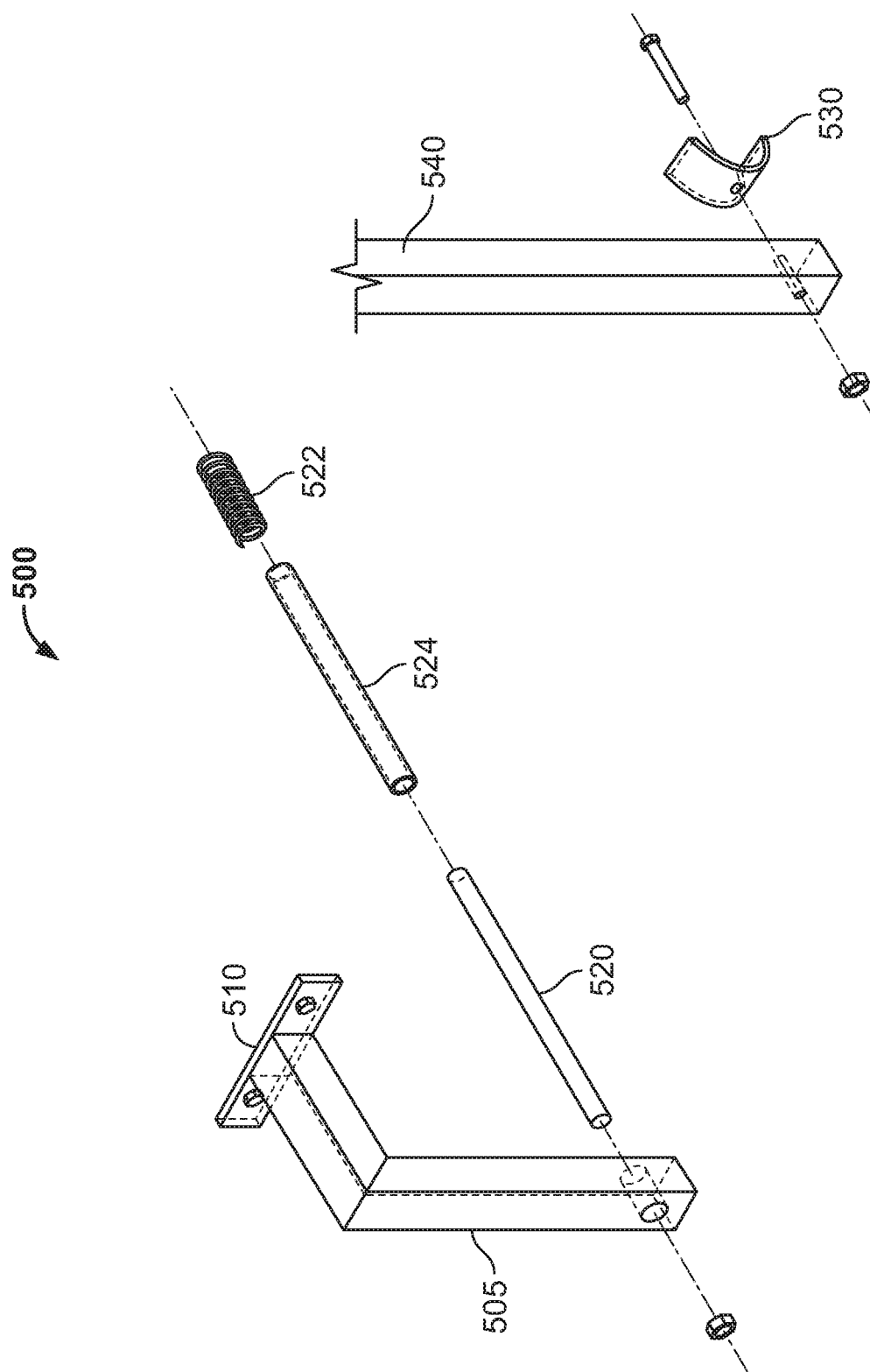
FIG. 5 is an exploded left front perspective view of the connector element shown in FIG. 2, showing connection of the various elements of this embodiment of the connector element.

FIG. 5 is an exploded left front perspective view of the embodiment of the connector arm 500 shown in FIG. 2, which includes various elements that provide for support, movement, and retention force when in operation. As shown, a rod or guidepost 520 may be covered by a sleeve 524, which may be covered by a spring 522. The spring 522 may be a compression spring, and provide for a certain amount of force against the arm, thereby enabling a user to slide the arm 540 outward, align the retention member 530 with a member of a wheelchair, and release the arm 540 so that the retention member 530 presses against the member of the wheelchair to be securely engaged thereto. The force or tension of the two springs 522 are to retain the cart 100 to the wheelchair, such that when a user turns the wheelchair, the cart 100 follows.

Figure 6A:
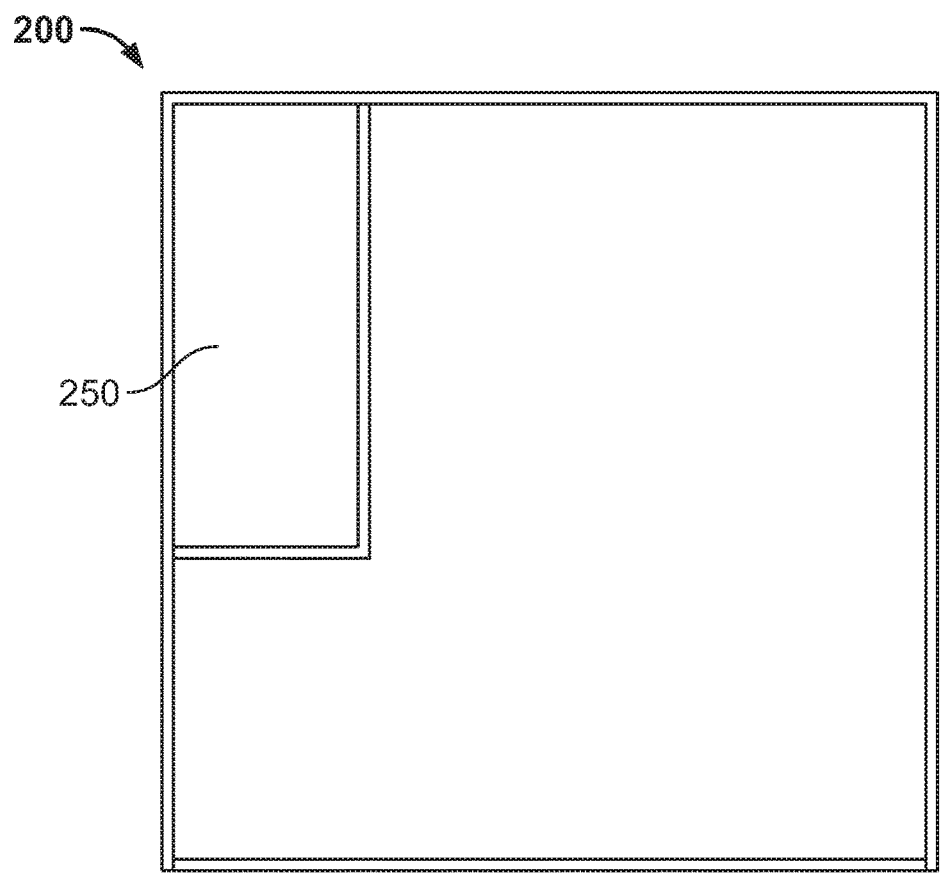
FIGS. 6A-6D are illustrations of different views of an embodiment of a basket of the cart.
Figure 6B:
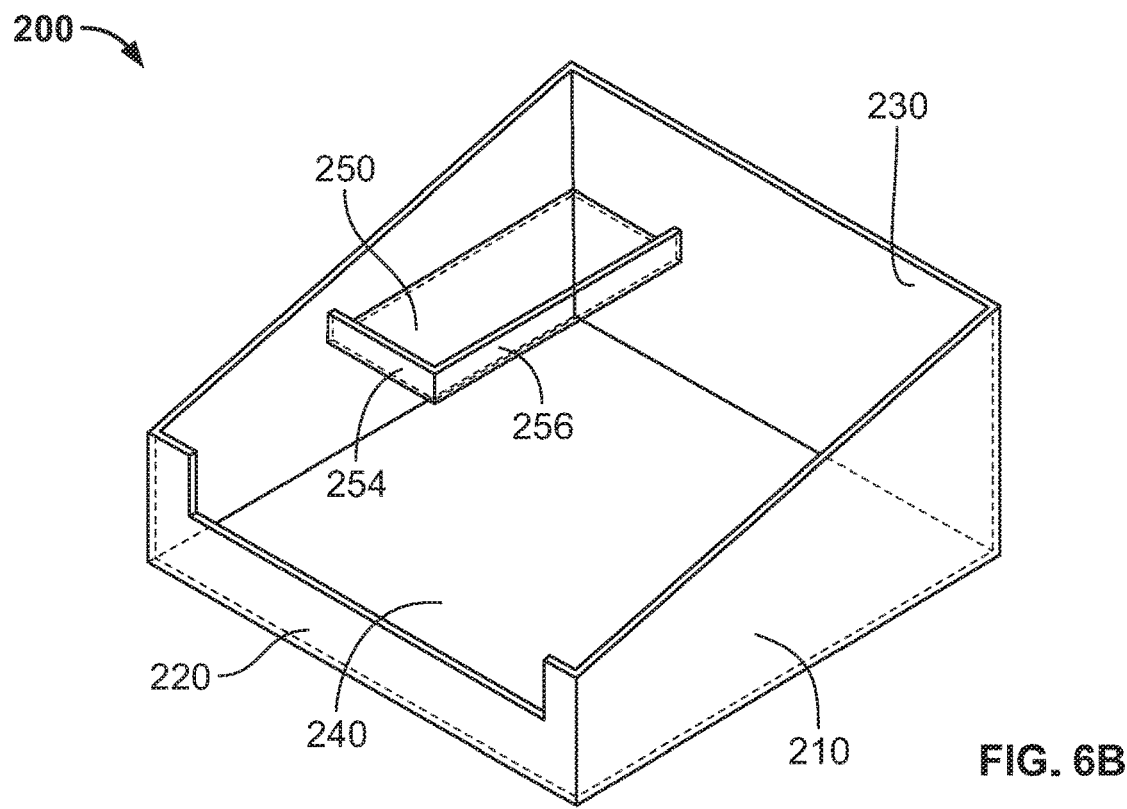

FIG. 6A shows a top view of the basket 200 of FIG. 1A. According to an embodiment of the invention, dimensions of the basket may be 24"×24"; however, it should be understood that other dimensions may be utilized. In addition, the basket 200 may include a shelf 250, such as 6"×14" may be sized for a carton of eggs or other fragile foods or items. The shelf 250 may include sidewalls having a height that is tall enough to prevent taller items to be prevented from falling out. For example, the shelf 250 may be arranged at a corner of the basket 200, such that the sidewalls include a shelf front wall 254, a shelf sidewall 256, one of the basket sidewalls 210, and the basket back wall 230. According to an embodiment of the invention, the height of the shelf front wall 254 and the shelf sidewall 256 is one inch, and the shelf bottom surface 252 is located above and spaced apart from a bottom surface 240 of the basket 200. It should be understood that the shelf 250 may be larger or smaller, and optionally have other dimensional configurations. Additionally, the basket front wall 220 may have a cutout portion C to facilitate placement of items into the basket by the user, such as shown in FIG. 6B. According to an embodiment of the invention, the cutout portion C may measure 3 inches by 19.5 inches, but is not limited thereto. As previously described, other support members may be provided to support small or large items.

Figure 6C:
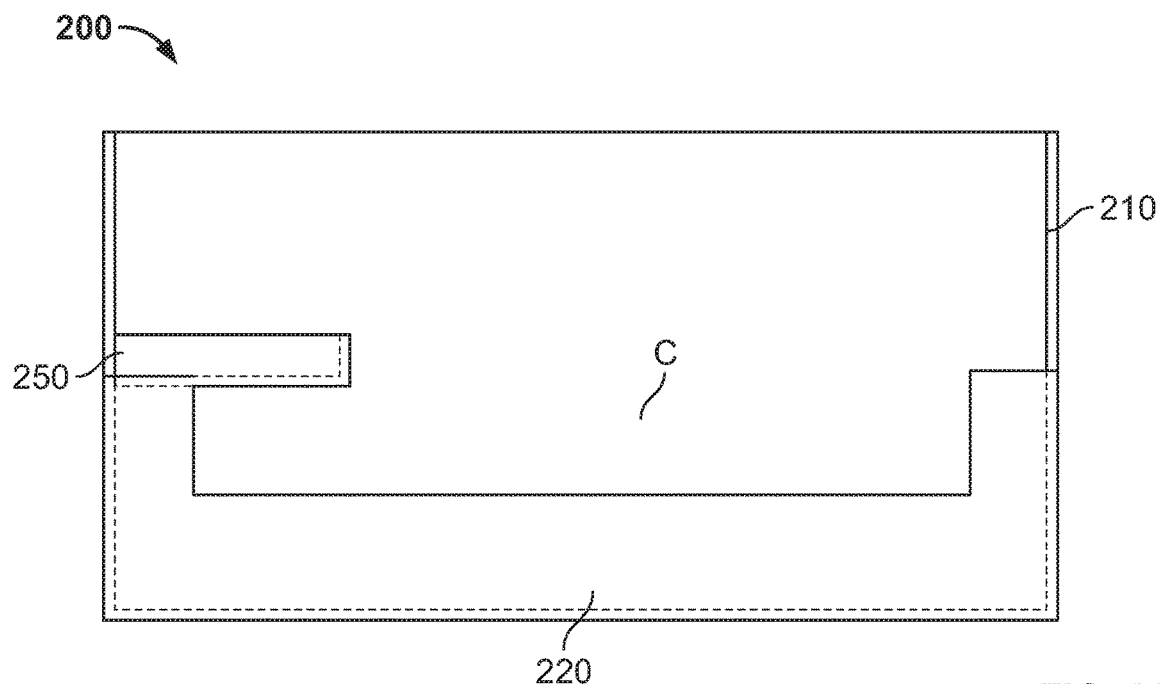
Figure 6D:
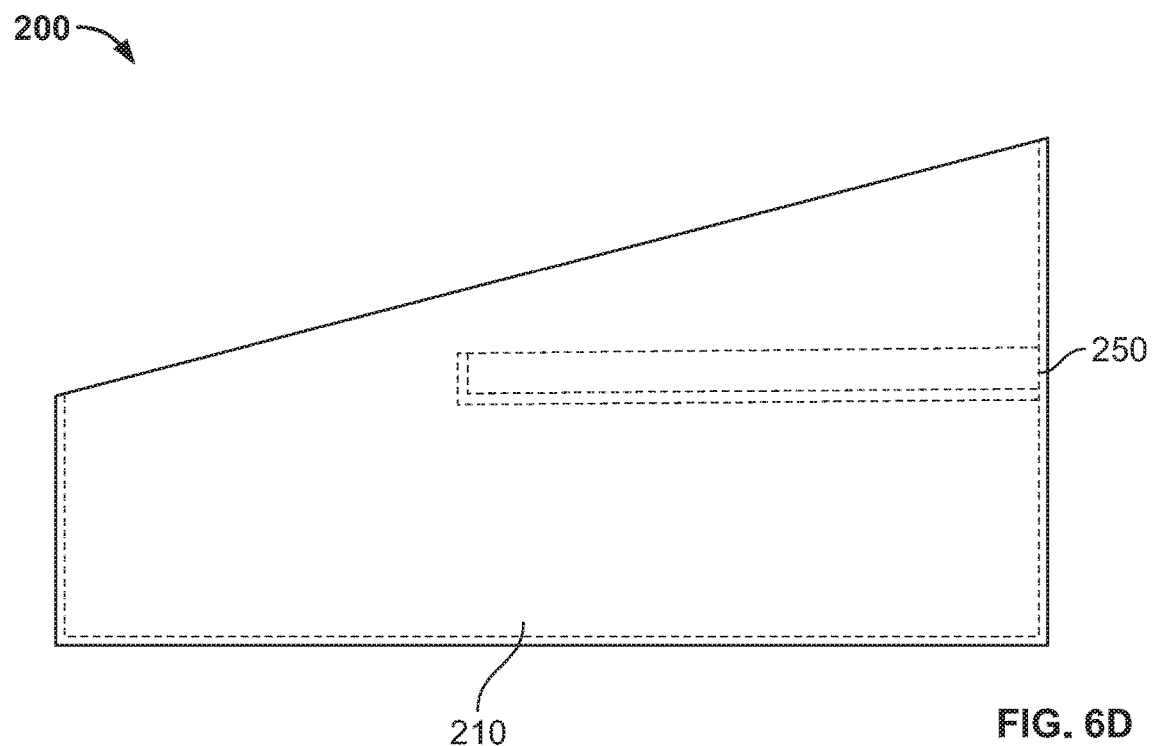

FIG. 6B shows a top rear right perspective view of the basket 200 of FIG. 6A. FIG. 6C shows a front view of the basket 200 of FIG. 6A. FIG. 6D shows a side view of the basket of FIG. 6A.

Figure 7A:
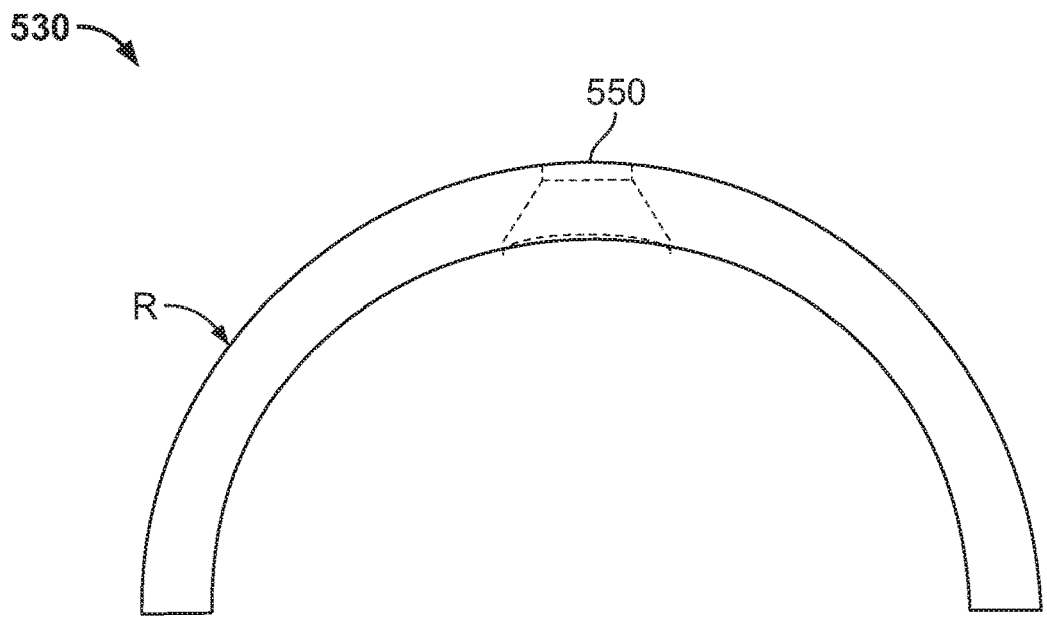
FIGS. 7A-7D are illustrations of different views of one embodiment of a connector member, in this case a semi-circular member.

FIG. 7A shows a top view of a retention member 530 of FIG. 1A. The retention member 530 may be made of a nylon, metal, plastic, or any other material that is sufficiently rigid so as to not bend when a force to move the cart 100 is applied thereto. The retention member 530 may, however, be flexible enough to latch or attach onto a bar of a wheelchair, in an embodiment. According to an embodiment of the invention, the retention member 530 may have a half-circle shape and a radius R of 0.95 inches. Alternative shapes and dimensions may be utilized. The retention member 530 may define an opening 550 through which a screw or bolt may extend to connect to the arm for retaining the retention member 530. As shown, for example 550, the opening may be centrally disposed and have a radius of 0.190 inches to receive a screw or a bolt.

Figure 7B:
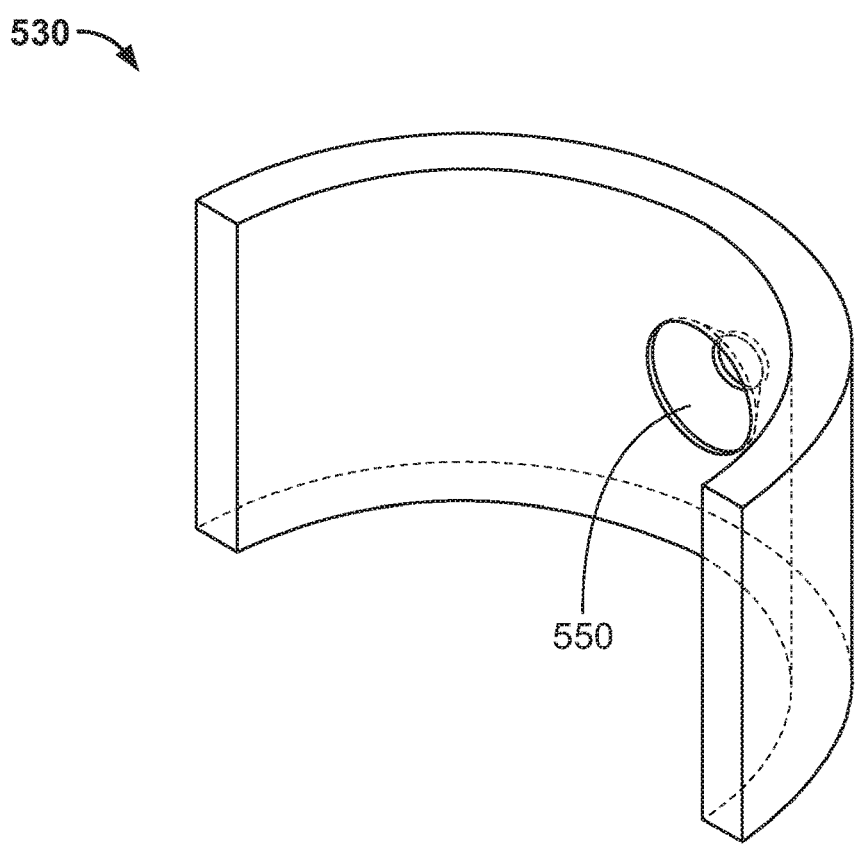
Figure 7C:
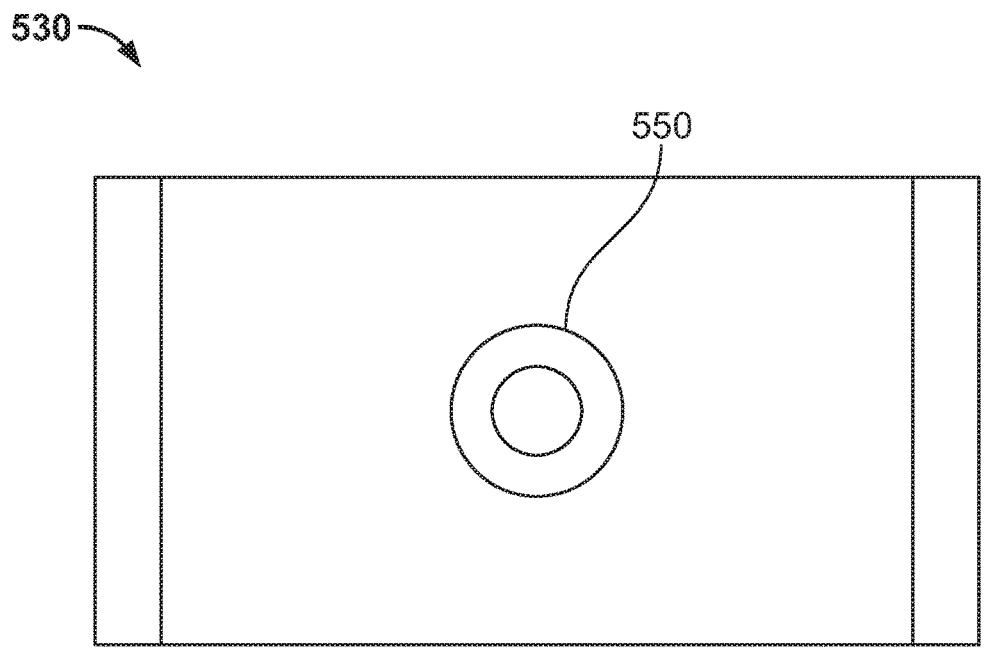
Figure 7D:
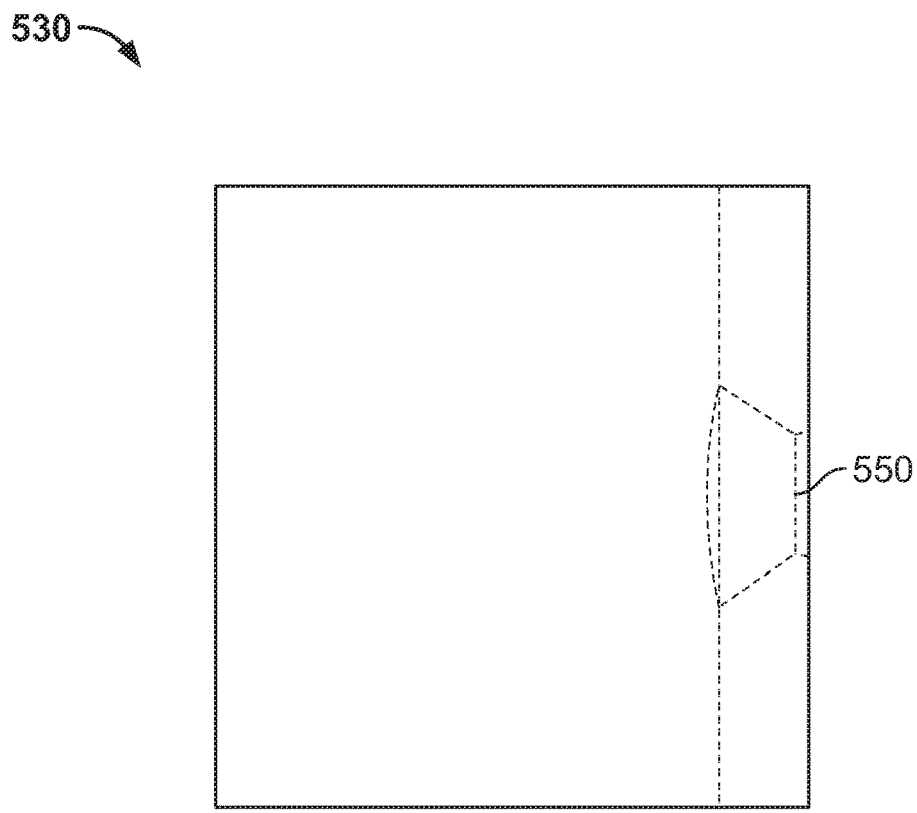

In an embodiment, the retention member 530 may further include a lock mechanism (not shown) that may be used to ensure that the retention member 530 does not pull away from the wheel chair in the event that the wheelchair begins to separate from the retention member 530 (e.g., while going over a curb). In another embodiment, no lock mechanism may be used to avoid the wheelchair being held together with the cart for safety purposes. FIG. 7B shows a top front right perspective view of the retention member 530 of FIG. 7A. FIG. 7C shows a front view of the retention member 530 of FIG. 7A. FIG. 7D shows a side view of the retention member 530 of FIG. 7A.

Figure 8B:
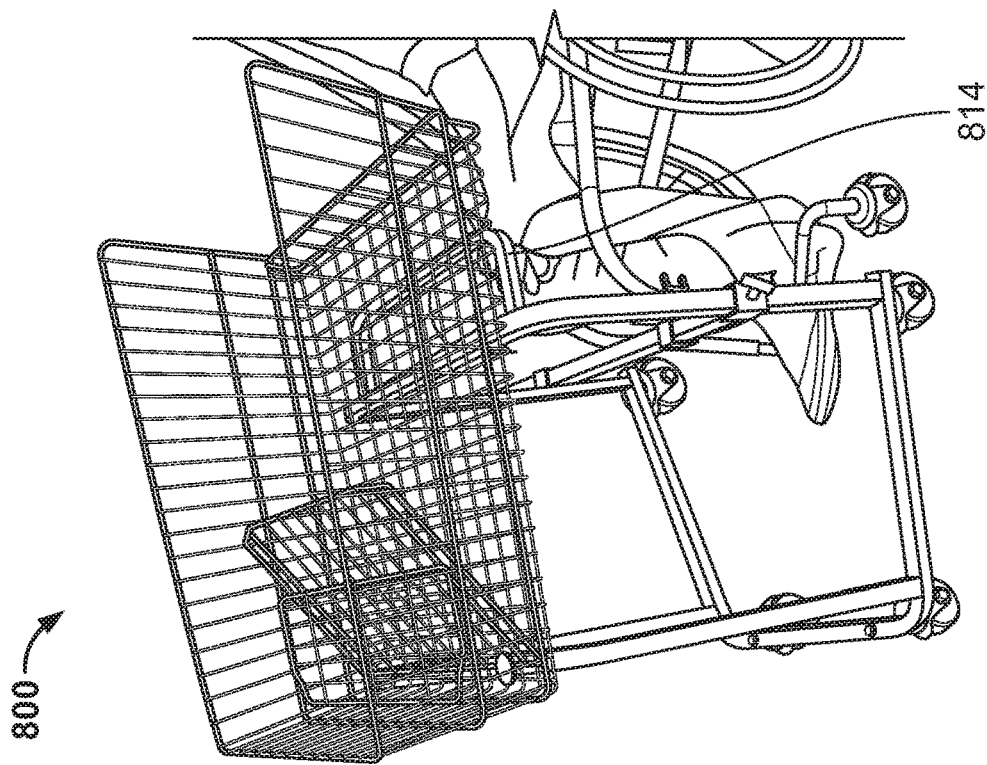
FIGS. 8A-8C are illustrations of different views of an illustrative embodiment of a cart configured to be releasably attached to a wheelchair.
Figure 8A:
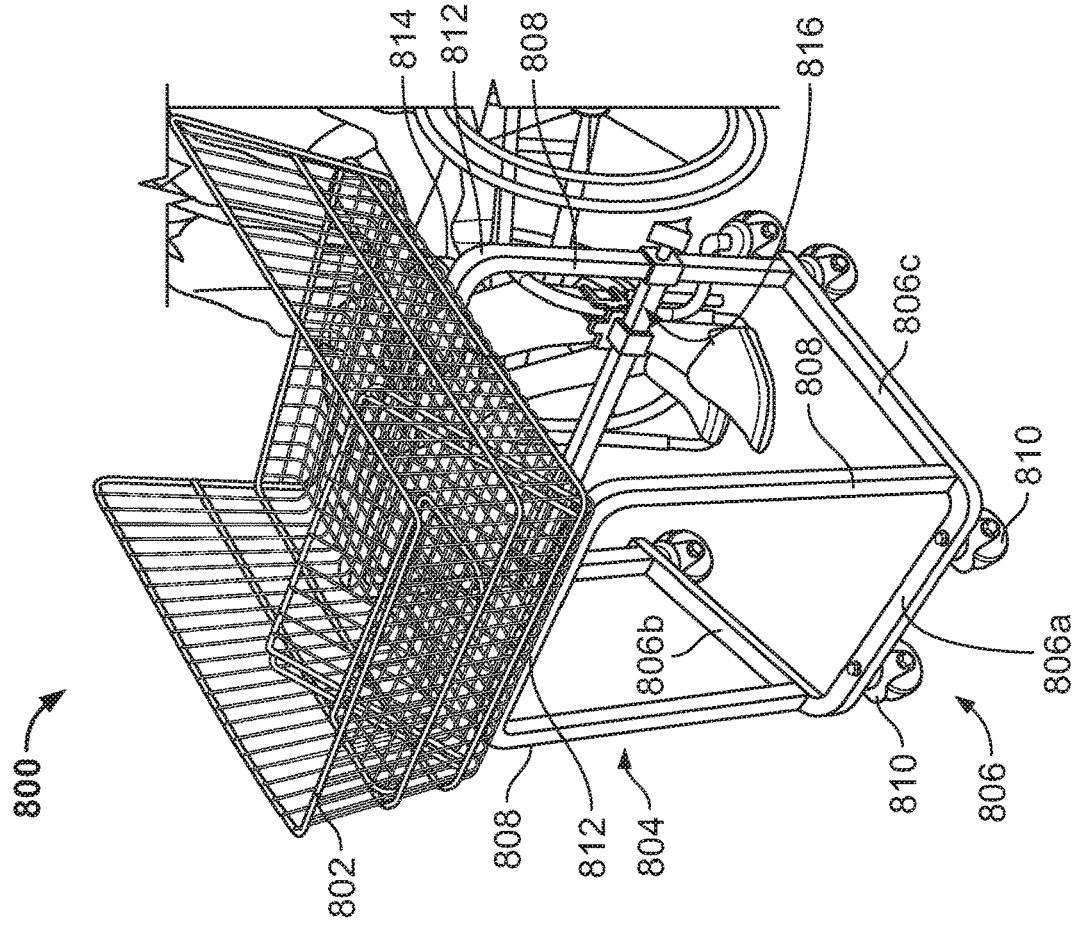
Figure 8C:
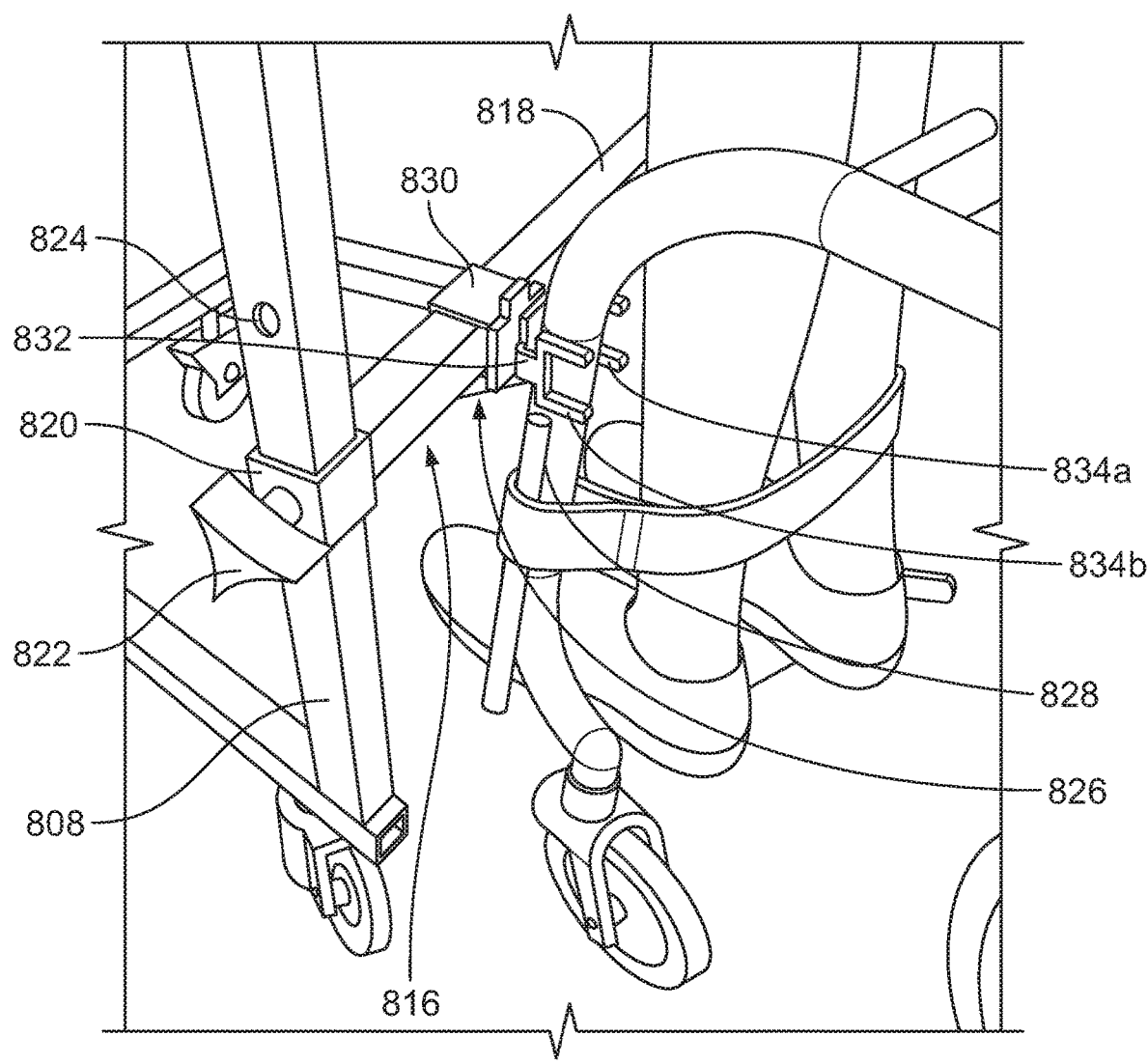

FIGS. 8A-8C illustrate another embodiment of a cart 800 configured to be releasably attached to a wheelchair in accordance with aspects of the present disclosure. As shown in FIG. 8A, cart 800 may include basket 802 and frame 804. The basket 802 may be similar to the basket 200 described above with regard to FIG. 2. The basket 802 may be connected to and/or supported by the frame 804. In aspects, the basket 802 may be configured to be releasable attached to the frame 804 with via fasteners, screws, or otherwise or may be permanently attached to the frame 804 by being welded, joined, or otherwise permanently attached.

The frame 804 may include a base 806 and multiple vertical members 808. As shown, the base 806 may be formed in a shape that facilitates supporting of the vertical members 808, which may provide support for the base 806, and that provides an area for comfortably allowing a wheelchair footrest to be positioned during operations to be positioned (e.g., while the cart is attached to the wheelchair). In embodiments, base 806 may have a U-shape, and side legs 806b and 806c of the base 806 may angularly extend outwardly from the a front leg 806a toward a rear of the cart 800 so that a sufficient opening is provided to enable a user to use the cart 800. The outward angle of the side legs 806b and 806c from front to rear relative to the front leg 806a may be between about 10° and 45°. It should be understood that alternative angles may be utilized. It should also be understood that it is possible for a distance between the legs 806b and 806c and length of the front leg 806a to be sufficiently wide such that no outward angle is needed (i.e., the side legs 806b and 806c may be parallel with one another).

The base 806 may be configured to support each of the vertical members 808. The vertical members 808 may be connected to base the 806 via welding, connector members or fasteners (e.g., nuts and bolts), adhesives, or any combination thereof. The vertical members 808 may be connected to the base 806 at different points along the body of the base 806. In embodiments, the location at which the vertical members 808 may be connected to the base 806 may be determined based on the number of vertical members, stability requirements, strength requirements, weight requirements, and/or otherwise. For example, as shown in FIG. 8A, four vertical members 808 may be utilized to support the basket 802 with the base 806. In this example, each of the four vertical members 808 may be positioned at each "corner" of the U-shaped base 803. As will be appreciated, this arrangement of the four vertical members may provide stability and strength. However, other configurations are possible.

In embodiments, wheels may be attached to the lower side of the base 806, and may be configured to support the frame 804 and basket 802. As shown, two pairs of wheels 810, including a pair of forward wheels and a pair of rear wheels may be attached to the base 806.

Each of the vertical members 808 may have a first end and a second end. In embodiments, the first end of the vertical members 808 may be connected to the base 806, and the second end of the vertical members 808 may be connected to the basket 802. Although, as shown, the frame 804 includes four vertical members, it should be understood that alternative numbers of vertical members (e.g., 1 or more members) may be utilized based on system requirements. The vertical members 808 may be connected to each other by cross-members 812. In some embodiments, the cross-members 812 may be integrated with the vertical members 808. For example, any two of the vertical members 808 may be formed by bending a single piece of material into an upside down U-shape, such that two of the vertical members 808 are formed. In other embodiments, the cross-members 812 may be welded, adhered, bolted, fastened, and/or otherwise attached to an end of each of the vertical members 805. The cross-members 812 may provide support for the basket 802.

In some embodiments, as shown in FIG. 8B, a basket support structure 814 that is connected to a top portion of rear vertical members 808 may be used to support the basket 802. The basket support structure 814 is shown to be a widened U-shape extending from the rear vertical members 808, thereby providing added support to a rear portion of the basket 802 where a user may place groceries or other items in the basket 802. It should be understood that the basket support structure 814 may be any other shape that provides additional support to the basket 802 other than a U-shape, such as a rectangle, oval, or otherwise.

With reference back to FIG. 8A, a wheelchair connector assembly 816 may be provided to enable a wheelchair to be releasably connected to the cart 800. The wheelchair connector assembly 816 may include a horizontal guidepost 818 and connecting brackets or sleeves 820 connected to the horizontal guidepost 818. The connecting brackets 820 may be configured to slide up and down on the rear vertical members 808 to enable a user to position the horizontal guidepost 818 to a desired height.

Referring now to FIG. 8C, as previously described, the wheelchair connector assembly 816 may include the guidepost 818 that may be slideably attached and repositionable to the rear vertical members 808 of the frame 804 by the connecting brackets 820. As shown, the connecting brackets 820 may include locking members or mechanisms 822 (e.g., screw lock, a latch, a set screw, a pin, etc.) at a desired vertical position on the vertical members 808.

In an embodiment, the rear vertical members 808 may define vertical positioning holes 824 that enables the locking mechanism 822 to lock the horizontal guidepost 818 at that location. The locking mechanisms 822 may include a rotatable knob, spring-loaded releasable mechanism with a head to allow a user to pull, or otherwise. As shown, the locking mechanisms 822 are positioned on the outside surface of the rear vertical members 808, but the locking mechanisms 822 may be positioned on any other surface of the rear vertical members 808 and provide for the same or similar functionality. It should be understood that the vertical positioning holes 824 are aligned on each of the rear vertical members 808 so that the horizontal guidepost 818 may remain horizontal when the two locking mechanisms 822 are locked to corresponding vertical positioning holes 824. There may be a number of vertical positioning holes 824 along the rear vertical members 808, and the position of the holes 824 may vary depending on the configuration of the connecting brackets 820. It should further be understood that while the horizontal guidepost 818 provides for a solution that is structurally easy and cost effective to produce, that alternative configurations for supporting the locking mechanisms 822 in alignment with the portion(s) of the wheelchair so that a connection may be securely made. For example, vertical bars may extend downward from the rear crossmember 812 and/or basket support structure 814. Still yet, a pair of vertical members may be formed at the rear of the cart that results in a full or partial cross-bar to which the locking mechanisms 822 may be connected. In an alternative embodiment, rather than the locking mechanism be attached to the cart, it is conceivable that the locking mechanism may be attached to the wheelchair and the user may releasably attach to the cart 800.

The wheelchair connector assembly 816 may include wheelchair retention brackets 826 to retain a wheelchair to the cart 800. The wheelchair retention brackets 826 may be configured to releasably engage a front vertical leg 828 of a wheelchair, and to be repositionable along the horizontal guidepost 818. The wheelchair retention bracket 826 may include a slideable member 830 and wheelchair retention member 832. The slideable member 830 and wheelchair retention bracket 826 may be connected to each other. The slideable member 830 may be slideably connected to the horizontal guidepost 818. In embodiments, the slideable member 830 may be configured to slide along the horizontal guidepost 818 to facilitate adjusting the position of wheelchair retention bracket 826 along the guidepost 818 to accommodate for different widths of wheelchairs. In an embodiment, the slideable member 830 may include a locking mechanism (not shown) configured to lock the position of the retention bracket 826 along guidepost 818. The locking mechanism of the slideable member 830 may be a pin, rotational element (e.g., threaded bolt or screw), or otherwise (e.g., spring-loaded pin). That is, the locking mechanism may include any adjustable structural component (e.g., screw lock, a latch, a set screw, a pin, etc.) that prevents the retention bracket 826 from sliding along the horizontal guidepost 818. By using a slideably adjustable retention bracket 826, the cart 800 may allow engagement with wheelchairs of different designs and/or widths.

The retention bracket 826 may include a side retention members 832 on which one or more guides or rollers 834 may be rotatably connected to enable front legs 828 to be releasably attached to the cart 800. In embodiments, the retention members 832 may have a curved shape, such as a semi-circular shape (e.g., a C-shape or U-shape) and include the guide(s) 834 attached to the front side(s) of the retention members 832 to help guide the front legs 828 into the retention members 832.

The curved shape may be configured to allow the retention members 832 to apply a compression force upon a portion (e.g., front legs 828) of the wheelchair to be attached thereto. The compression force may either compress the retention members 832 onto the portion of the wheelchair or merely retain the portion of the wheelchair so as to prevent the wheelchair from detaching from the retention members 832 unless a sufficient disengagement-force is applied (e.g., a force applied to disengage the wheelchair from retention members 832).

The disengagement or retention force may define an amount of force needed to separate the retention members 832 when removing the portion of the wheelchair therefrom. The force may range from 5 psi to 30 psi, for example. The compression force and/or retention force may provide for the wheelchair to be securely attached to the cart 800 so that a user of the wheelchair may rotate or otherwise more or stop the wheelchair with confidence that the wheelchair will not separate therefrom. Of course, the compression and/or retention force of the retention brackets 826 should be such that a user of a wheelchair may easily connect with and separate from the retention brackets 826. While some minimal amount of compliance may exist at the retention members 832 when attached to the wheelchair, by connecting the wheelchair (e.g., front legs 828) to the base 806 of the cart 800 using the retention bracket 826, as opposed to arms that are more flexible, the user may feel that the cart 800 is securely fastened to the wheelchair when operating in a grocery store, for example. For example, as shown in FIG. 8C, the front leg 828 of the wheelchair may be compressibly inserted into the wheelchair retention bracket 826. In this example, the retention members 832 may applies a compression force against the front legs 828 to prevent the front legs 828 from disengaging therefrom.

To help ensure that the releasable connection between the cart 800 and wheelchair is "solid," the distance between the front legs 828 of the wheelchair and the horizontal guidepost 818 should be small to as to limit a large moment-arm when the user of the wheelchair rotates the wheelchair. That is, the close the wheelchair is to the cart 800, the less "play" or relative motion between the two devices. For example, if the length of the retention members 832 is short, such as below about 4-inches, then the front legs 828 of the wheelchair and horizontal guidepost 818 may be small (e.g., below about 2-inches, where being about 2-inches could be as far as 2½- or 3-inches). It should be understood that By having a shorter overall length of the combined wheelchair and cart 800, the easier it is for a user of the wheelchair to control the cart and be able to move within limited space in a store.

In embodiments, the guide(s) 834 may be configured to rotate about the connection point(s) (e.g., at least one open end of the semi-circular shape of retention member 832) to facilitate the portion of the wheelchair sliding into retention member 832. The guides 834 may be made of a material (e.g., rubber, silicone, soft plastic, metal, steel, iron, etc.) configured to facilitate the sliding of the portion of the wheelchair into the retention members 832.

As used herein, compressibly inserting a portion of the wheelchair into retention member 832 may refer to the action of causing the portion of the wheelchair to be pushed against the open end of the curved retention members 832 with sufficient force such that the semi-circle, for example, may open sufficiently for the portion of the wheelchair to be inserted into retention members 832.

Figure 9:
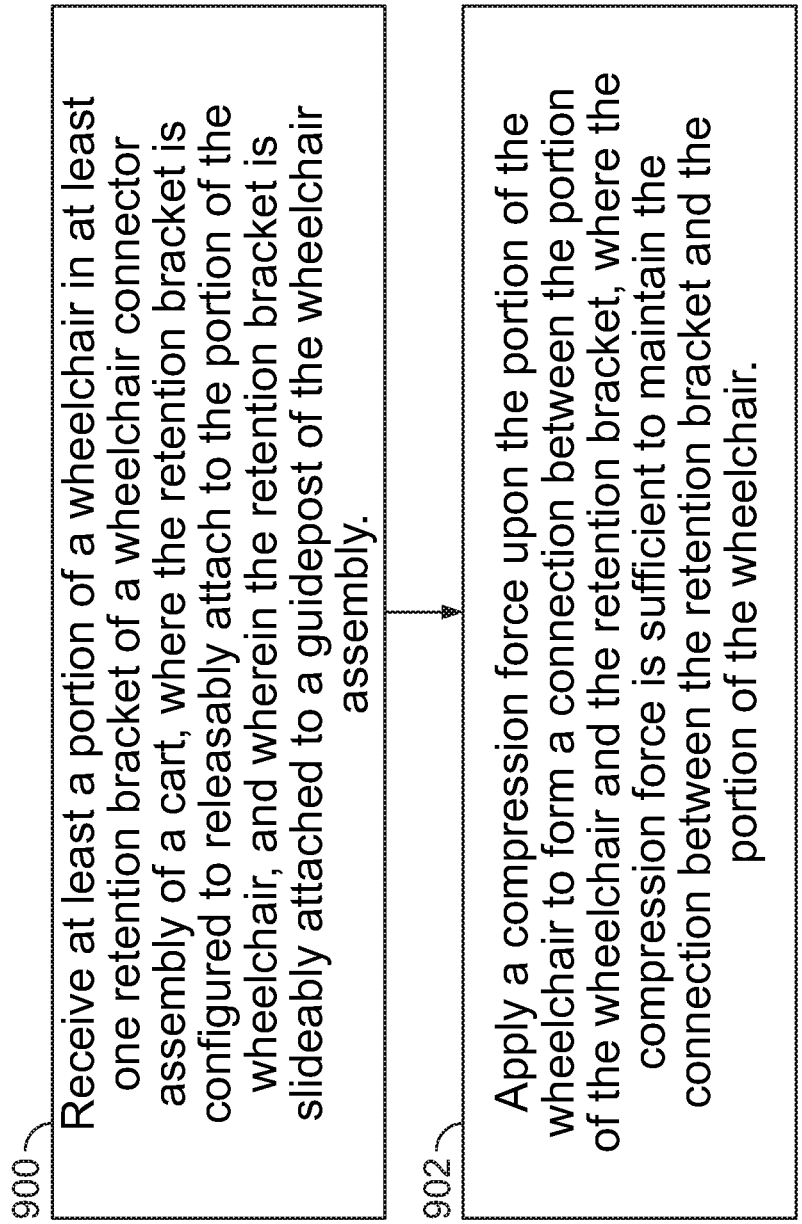
FIG. 9 shows a flow diagram illustrating example blocks executed to implement aspects of the present disclosure.

FIG. 9 shows a flow diagram illustrating an illustrative process to implement one aspect of the present disclosure. In particular, the illustrated process provides for releasably attaching a cart implemented to a wheelchair in accordance with aspects of the present disclosure. At block 900, at least one retention bracket of a wheelchair connector assembly of the cart receives at least a portion of a wheelchair. The retention bracket may be similar to retention bracket 826 described above, and may be configured to releasably attach to the portion of the wheelchair. For example, a user may cause the portion of the wheelchair (e.g., a leg, a part of the wheelchair's frame, etc.) to be pushed or inserted into the retention bracket. The retention bracket may be configured to accept the portion of the wheelchair and to facilitate insertion of the portion of the wheelchair into the retention bracket. For example, the retention bracket may include a retention member (e.g., retention members 832) having at least one guide (e.g., guide(s) 834) of a particular material, as described above, and configured to rotate such that the portion of the wheelchair is guided into the retention member's C-shape, U-shape, H-shape, or otherwise, by the insertion force. It should be understood that the retention bracket should be configured to have sufficient force to be maintained under normal operating conditions within a store or other flat surface (e.g., horizontal parking lot), but that in the event that the user ends up on a slope that is perpendicular, for example, to the direction of movement, that the retention force may be low enough to separate from the wheelchair so that the cart 800 does not cause the wheelchair to tip over.

At block 902, a compression force is applied upon the portion of the wheelchair to form a connection between the portion of the wheelchair and the retention bracket. The compression force applied upon the portion of the wheelchair may be sufficient to maintain the connection between the retention bracket and the portion of the wheelchair. In embodiments, the compression force may be applied by the retention member. For example, as described above, the retention member may be configured to have a curved shape, such as a semi-circular shape (e.g., a C-shape). The curved shape may be configured to allow the retention member to apply the compression force upon the portion of the wheelchair that is compressibly inserted into the opening of the semi-circular shape, thereby preventing the portion of the wheelchair from detaching from the retention member, unless a sufficient disengagement-force is applied.

In embodiments, detaching the portion of the wheelchair from the retention bracket may include receiving a disengaging force from a user upon the connection between the retention bracket and the portion of the wheelchair. The disengaging force may include a force acting to separate the retention bracket from the portion of the wheelchair. For example, the user may cause the wheelchair to be pulled away from the cart, thereby applying the disengaging force. When the disengaging force is sufficient to overcome the compression force being applied upon the portion of the wheelchair by the retention member of the retention bracket, the portion of the wheelchair may detach from the retention bracket. The disengaging force is sufficient to overcome the compression force when the disengaging force is sufficient to cause the curved shape of the retention member to sufficiently open to allow the portion of the wheelchair to escape from the retention member.

FIG. 10 shows a flow diagram illustrating example blocks executed to implement one aspect of the present disclosure.

In particular, the illustrated flow diagram shows a method for manufacturing a cart configured to releasably attach to a wheelchair. At block 1000, a frame is formed. In embodiments, the frame may include a base and multiple vertical members. A pair of vertical members may be disposed at the rear of the cart In embodiments, the frame may be similar to frame 804 described above. At block 1002, the frame may be directly or indirectly connected to basket (e.g., basket 802). At block 1004, multiple wheels may be directly or indirectly connected to the frame to enable the cart to be rotatably moved. In embodiments, the wheels may be connected to a base of the frame of the cart, as described above.

At block 1006, a wheelchair connector assembly may be connect to the frame. In embodiments, the wheelchair connector assembly may be similar to wheelchair connector assembly 806 described above. In particular, the wheelchair connector assembly may be horizontally connected to one or more vertical members of the frame, and may include a guidepost slideably attached and repositionable to a corresponding vertical member of the frame. In embodiments, a connecting bracket may be attached to each end of the guidepost, and may be configured to facilitate adjusting a height of guidepost with respect to the bottom portion of the frame, by sliding the guidepost up and down the vertical members. It should be understood that alternative processes and/or configurations of the cart may be used to perform the same or similar functionality, and may be performed in a different order as described herein.

In embodiments, the wheelchair connector may include at least one retention bracket (e.g., retention bracket 826 described above). The retention bracket may be configured to releasably attach to the wheelchair, as described in more detail above, and to be repositionable along the guidepost.

Definitions and methods described herein are provided to better define the present disclosure and to guide those of ordinary skill in the art in the practice of the present disclosure. Unless otherwise noted, terms are to be understood according to conventional usage by those of ordinary skill in the relevant art.

In some embodiments, numbers expressing quantities, length, width, other properties, and so forth, used to describe and claim certain embodiments of the present disclosure are to be understood as being modified in some instances by the term "about." In some embodiments, the term "about" is used to indicate that a value includes the standard deviation of the mean for the device or method being employed to determine the value. In some embodiments, the numerical parameters set forth in the written description and attached claims are approximations that can vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the present disclosure are approximations, the numerical values set forth herein are reported as precisely as practicable. The numerical values presented in some embodiments of the present disclosure may contain certain errors necessarily resulting from the standard deviation found in their respective testing measurements. The recitation of ranges of values herein is merely intended to serve as a shorthand method of referring individually to each separate value falling within the range. Unless otherwise indicated herein, each individual value is incorporated into the specification as if it were individually recited herein.

In some embodiments, the terms "a" and "an" and "the" and similar references used in the context of describing a particular embodiment (especially in the context of certain of the following claims) can be construed to cover both the singular and the plural, unless specifically noted otherwise. In some embodiments, the term "or" as used herein, including the claims, is used to mean "and/or" unless explicitly indicated to refer to alternatives only or the alternatives are mutually exclusive.

The terms "comprise," "have" and "include" are open-ended linking verbs. Any forms or tenses of one or more of these verbs, such as "comprises," "comprising," "has," "having," "includes" and "including," are also open-ended. For example, any method that "comprises," "has" or "includes" one or more steps is not limited to possessing only those one or more steps and can also cover other unlisted steps. Similarly, any composition or device that "comprises," "has" or "includes" one or more features is not limited to possessing only those one or more features and can cover other unlisted features.

All methods described herein can be performed in any suitable order unless otherwise indicated herein or otherwise clearly contradicted by context. The use of any and all examples, or exemplary language (e.g., "such as") provided with respect to certain embodiments herein is intended merely to better illuminate the present disclosure and does not pose a limitation on the scope of the present disclosure otherwise claimed. No language in the specification should be construed as indicating any non-claimed element essential to the practice of the present disclosure.

Groupings of alternative elements or embodiments of the present disclosure disclosed herein are not to be construed as limitations. Each group member can be referred to and claimed individually or in any combination with other members of the group or other elements found herein. One or more members of a group can be included in, or deleted from, a group for reasons of convenience or patentability. When any such inclusion or deletion occurs, the specification is herein deemed to contain the group as modified thus fulfilling the written description of all Markush groups used in the appended claims.

Having described the present disclosure in detail, it will be apparent that modifications, variations, and equivalent embodiments are possible without departing the scope of the present disclosure defined in the appended claims.

As various modifications could be made in the compositions and methods herein described without departing from the scope of the invention, it is intended that all matter contained in the foregoing description shall be interpreted as illustrative rather than limiting. The breadth and scope of the present invention should not be limited by any of the above-described exemplary embodiments, but should be defined only in accordance with the following claims appended hereto and their equivalents. All patent and non-patent documents cited in this specification are incorporated herein by reference in their entireties.

What is claimed:

1. A cart that is releasably attachable to a wheelchair, said cart comprising: a frame including a base and a plurality of vertical members; a basket connected to said frame; a plurality of wheels connected to the base and configured to support said frame and said basket; and a wheelchair connector assembly connected to said frame, said wheelchair connector assembly including: a guidepost connected to at least two of the vertical members of said frame, wherein said guidepost has a first end and a second end, wherein said first end and said second end are slideably attached and repositionable to a corresponding vertical member of said frame; and at least one retention bracket slideably attached to said guidepost, said at least one retention bracket configured to releasably attach to at least a portion of said wheelchair.

2. The cart of claim 1, wherein said first end and said second end of said guidepost each have a corresponding connecting bracket configured to adjust a height of said guidepost with respect to a bottom frame portion of said frame by including at least one adjustment mechanism that enables said guidepost to slide up and down on said vertical members.

3. The cart of claim 2, wherein said connecting bracket includes a locking member configured to lock said corresponding end of said guidepost to said corresponding vertical member of said frame to prevent said guidepost from sliding on said frame.

4. The cart of claim 1, wherein said at least one retention bracket includes at least one of: a retention member configured to releasably attach to said at least portion of said wheelchair; and a slideable member connected to said retention member and configured to be slideably coupled to said guidepost.

5. The cart of claim 4, wherein said retention member is configured to apply a compression force upon said at least a portion of said wheelchair.

6. The cart of claim 4, wherein said retention member includes at least one guide attached to at least one end of said retention member, said at least one guide configured to guide said at least a portion of said wheelchair into said retention member.

7. The cart of claim 6, wherein said at least one guide is connected to said retention member at a connection point and is configured to rotate about said connection point to facilitate said at least a portion of said wheelchair sliding into said retention member.

8. The cart of claim 6, wherein said at least one guide is of a material configured to facilitate said at least a portion of said wheelchair sliding into said retention member.

9. The cart of claim 4, wherein a portion of the retention member is semi-circular.

10. The cart of claim 9, wherein the semi-circular portion of the retention member is substantially a "C" shape.

11. The cart of claim 4, wherein said slideable member is configured to adjust a location of said at least one retention bracket on said guidepost.

12. The cart of claim 11, wherein said configuration of said slideable member to adjust said location of said at least one retention bracket on said guidepost includes configuration of said slideable member to slide along said guidepost of said frame.

13. The cart of claim 11, wherein said slideable member includes a locking member configured to lock said at least one retention bracket to said guidepost to prevent said at least one retention bracket from sliding on said guidepost.

* * * * *